(12) United States Patent
Payne et al.

(10) Patent No.: US 10,607,291 B2
(45) Date of Patent: Mar. 31, 2020

(54) SYSTEMS AND METHODS FOR ELECTRONIC CONTINUOUS TRADING OF VARIANT INVENTORIES

(71) Applicants: Nasdaq Technology AB, Stockholm (SE); NYIAX, Inc., New York, NY (US)

(72) Inventors: Richard Payne, Sydney (AU); Valery Gridnev, Sydney (AU); Mark Grinbaum, Kendall Park, NJ (US); Sergey Tsoy, Brooklyn, NY (US); Carolina Abenante, Holmdel, NJ (US)

(73) Assignees: NASDAQ TECHNOLOGY AB, Stockholm (SE); NYIAX, INC., New York, NY (US)

(*) Notice: Subject to any disclaimer, the term of this patent is extended or adjusted under 35 U.S.C. 154(b) by 0 days.

(21) Appl. No.: 15/836,294

(22) Filed: Dec. 8, 2017

(65) Prior Publication Data

US 2019/0180368 A1 Jun. 13, 2019

(51) Int. Cl.
*G06Q 40/04* (2012.01)
*G06F 16/23* (2019.01)

(52) U.S. Cl.
CPC ......... *G06Q 40/04* (2013.01); *G06F 16/2379* (2019.01)

(58) Field of Classification Search
CPC .. G06Q 30/02; G06Q 30/0241; G06Q 10/087; G06Q 30/0269; G06Q 30/0277; G06Q 30/0202; G06Q 30/0244; G06Q 10/04; G06Q 30/0246; G06Q 30/0251; G06Q 30/0253; G06Q 30/0264; G06Q 30/0273; G06Q 10/0631; G06Q 30/0201; G06Q 10/06312; G06Q 10/06315; G06Q 10/067; G06Q 30/0254; G06Q 40/08; G06Q 40/00; G06Q 40/06; G06Q 40/04; G06Q 30/0623; G06Q 40/10; G06Q 50/14; G06Q 50/16; G06Q 30/06; G06Q 30/0261;

(Continued)

(56) References Cited

U.S. PATENT DOCUMENTS 5,978,785 A * 11/1999 Johnson .................. G06N 5/04
706/54
8,151,290 B1 * 4/2012 Ujihara ................ G06F 3/0481
707/756

(Continued)

FOREIGN PATENT DOCUMENTS

WO WO-2007117757 A2 * 10/2007 ......... H04W 72/1289
WO WO-2014109277 A1 * 7/2014 ............ G06F 16/285

OTHER PUBLICATIONS

Francis, Paul A.: An Introduction to Real-Time Stock Market Data Processing, May 20, 2013, Code Project, pp. 1-19. (Year: 2013).*

(Continued)

*Primary Examiner* — Bijendra K Shrestha
(74) *Attorney, Agent, or Firm* — Nixon & Vanderhye, P.C.

(57) ABSTRACT

The described technology relates to electronic continuous trading systems, and matching data records representing inventories with variant characteristics such as, variant length, variant data types, etc. Example implementations provide for generating instrument descriptors that include unitary-valued attributes and set-valued attributes, and the use of both types of attributes in trade decision making.

21 Claims, 14 Drawing Sheets

(58) Field of Classification Search
CPC . G06Q 30/0267; G06F 16/2365; G06F 16/23; G06F 16/2379
USPC .......................................................... 705/37
See application file for complete search history.

(56) References Cited

U.S. PATENT DOCUMENTS

| | | | | |
|---|---|---|---|---|
| 8,244,622 | B2 * | 8/2012 | Hughes, Jr. | G06Q 40/04 705/37 |
| 8,249,607 | B2 * | 8/2012 | McBeath | H04W 72/1289 370/330 |
| 8,601,000 | B1 * | 12/2013 | Stefani | G06F 16/278 707/747 |
| 9,767,127 | B2 * | 9/2017 | Feldschuh | G06F 16/215 |
| 9,940,473 | B2 * | 4/2018 | Takahashi | G06F 21/6218 |
| 2002/0138353 | A1 * | 9/2002 | Schreiber | G06Q 30/02 705/26.1 |
| 2009/0228327 | A1 * | 9/2009 | Roy | G06Q 30/02 705/14.66 |
| 2010/0185485 | A1 * | 7/2010 | Vee | G06Q 30/0254 705/14.52 |
| 2010/0191558 | A1 * | 7/2010 | Chickering | G06Q 10/0631 705/7.29 |
| 2011/0251875 | A1 * | 10/2011 | Cosman | G06Q 30/0202 705/7.31 |
| 2011/0258045 | A1 * | 10/2011 | Chickering | G06Q 10/00 705/14.53 |
| 2013/0117400 | A1 * | 5/2013 | An | H04L 63/0823 709/206 |
| 2014/0149105 | A1 * | 5/2014 | Lamba | G06F 17/2765 704/9 |
| 2015/0339488 | A1 * | 11/2015 | Takahashi | G06F 21/6218 726/29 |
| 2016/0127367 | A1 * | 5/2016 | Jevans | H04L 63/1433 713/152 |
| 2017/0371949 | A1 * | 12/2017 | Le Biannic | G06F 16/285 |

OTHER PUBLICATIONS

Cormode et al.: What's Hot and What's Not: Tracking Most Frequent Items Dynamically, Jun. 9-12, 2003, PODS 2003, ACM, pp. 1-11. (Year: 2003).*

McAfee: McAfee Database Event Monitor for SIEM—Gain visibility into database transactions without impacting performance, Sep. 2014, pp. 1-3. (Year: 2014).*

* cited by examiner

| Attribute Value | List Value | Note |
|---|---|---|
| 10004 | 1 | |
| 10005 | 2 | |
| 10006 | 3 | |
| 10007 | 4 | |
| 10038 | 5 | |
| 10280 | 6 | |

FIGURE 3B

| Attribute Value | List Value (bitwise) | Integer (Hex) |
|---|---|---|
| Jul 1 | 0000000000000000000000000000001 | 1 |
| Jul 1 & 2 | 0000000000000000000000000000011 | 3 |
| Jul 5-10 | 0000000000000000000000001111110000 | 3F0 |
| Jul Weekends | 0011000001100000110000110000011 | 3060C183 |
| Jul 31 | 0100000000000000000000000000000 | 40000000 |

FIGURE 3C

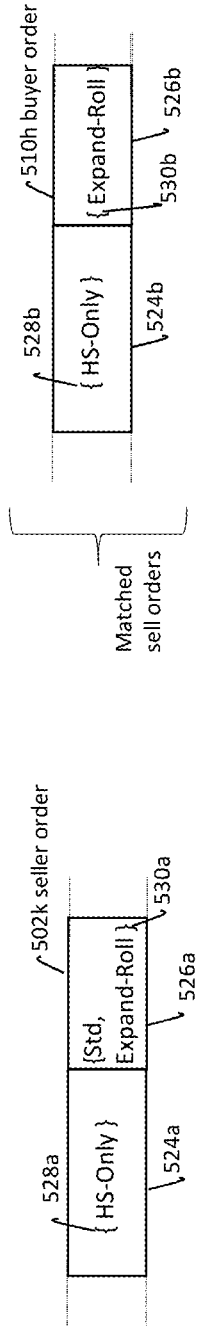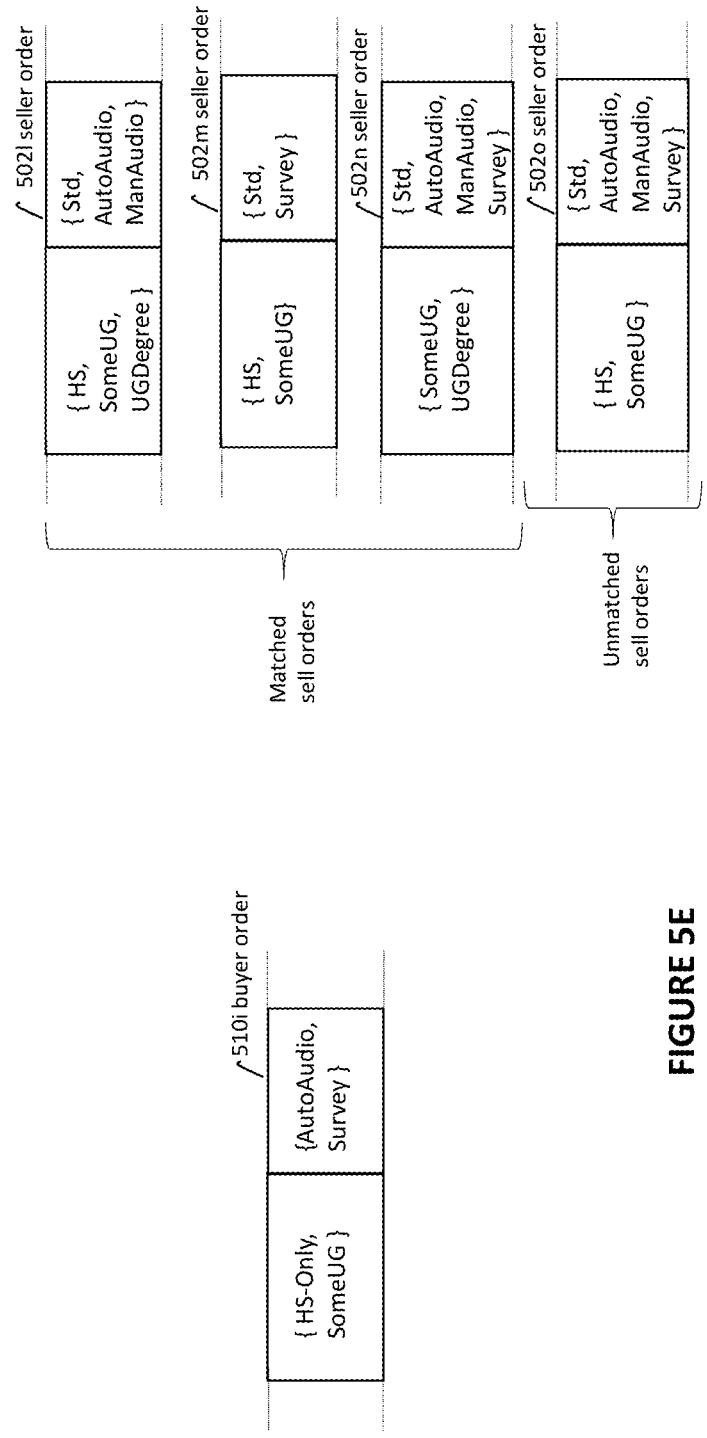
FIGURE 5D
FIGURE 5E

SYSTEMS AND METHODS FOR ELECTRONIC CONTINUOUS TRADING OF VARIANT INVENTORIES

CROSS REFERENCE(S) TO RELATED APPLICATION(S)

Not Applicable.

TECHNICAL OVERVIEW

The technology described relates to electronic continuous trading of inventories. More particularly, the technology described herein relates to electronically matching data records representing inventories with variant characteristics such as, variant length, variant data types, etc.

BACKGROUND

Currently available systems can efficiently perform continuous electronic matching of records of many types of inventories where the inventories and corresponding tradable instruments are defined with little or no variation and with few attributes. With only a few attributes of the same type or similar types to compare between tradable instruments, such systems can perform comparisons while complying with the stringent real-time requirements required for commercial applications such as continuous electronic trading.

However, as larger numbers and different types of attributes are required in order to be uniquely described, the current systems may fall short in terms of the stringent performance requirements and/or the capability to manipulate and to represent some highly variant inventories.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

An embodiment provides an electronic trading system, comprising at least one memory, a network interface, and a processing system. The memory includes a monitored database of stored electronic trading orders for a tradable instrument, each electronic trading order being in the form of a record having a plurality of attributes including a first set of unitary-valued attributes and a second set of set-valued attributes, wherein each unitary-valued attribute in the first set has exactly one value specified as its value, and at least one of the set-valued attributes of the second set has more than one value specified as its value. The network interface may be configured to receive, from one or more external computing devices, incoming electronic trading orders for the tradable instrument. The processing system may be configured to execute operations of a matching engine configured to identify a transaction for one of the incoming electronic trading orders by successfully matching, in accordance with a plurality of matching rules, the first set of unitary-valued attributes and the second set of set-valued attributes of the incoming electronic order with the first set of unitary-valued attributes and the second set of set-valued attributes of at least one of said stored electronic trading orders. The processing system is further configured to update the monitored database in accordance with the transaction, and to transmit, via the network interface, information corresponding to the transaction.

Another embodiment provides method performed by an electronic trading system. The method includes accessing stored electronic trading orders for a tradable instrument in a monitored database, each electronic trading order being in the form of a record having a plurality of attributes including a first set of unitary-valued attributes and a second set of set-valued attributes, wherein each unitary-valued attribute in the first set has exactly one value specified as its value, and at least one of the set-valued attributes of the second set has more than one value specified as its value. The method also includes: receiving, via a network, incoming electronic trading orders for the tradable instrument from one or more external computing devices; comparing, in accordance with a plurality of matching rules, the first set of unitary-valued attributes and the second set of set-valued attributes of an incoming electronic order with the first set of unitary-valued attributes and the second set of set-valued attributes of at least one of said stored electronic orders; identifying a transaction for the incoming electronic trading order based on a result of the comparing; updating the monitored database in accordance with the transaction; and transmitting, via the network interface, information corresponding to the transaction.

Another embodiment provides a non-transitory computer readable storage medium storing program instructions that, when executed by a processor of a computer, causes the computer to perform operations including accessing stored electronic trading orders for a tradable instrument in a monitored database, each electronic trading order being in the form of a record having a plurality of attributes including a first set of unitary-valued attributes and a second set of set-valued attributes, wherein each unitary-valued attribute in the first set has exactly one value specified as its value, and at least one of the set-valued attributes of the second set has more than one value specified as its value. The operations also include receiving, via a network, incoming electronic trading orders for the tradable instrument from one or more external computing devices; comparing, in accordance with a plurality of matching rules, the first set of unitary-valued attributes and the second set of set-valued attributes of an incoming electronic order with the first set of unitary-valued attributes and the second set of set-valued attributes of at least one of said stored electronic orders; identifying a transaction for the incoming electronic trading order based on a result of the comparing; updating the monitored database in accordance with the transaction; and transmitting, via the network interface, information corresponding to the transaction.

This summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

FIGS. 3B and 3C illustrate example attribute value encodings, according to some example embodiments;

FIG. 5A-5E illustrate example set-valued attributes in orders and matching between attributes, according to some example embodiments;

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

The technology described herein relates to, among other subjects, electronic continuous trading systems and techniques. The systems and techniques described here are particularly suited for electronic trading of variant inventories, such as, for example, inventory types identified by a large number of attributes, including attributes having different value types such as, for example, unitary type values and set (or array) type values. Example inventories include advertising on multiple forms of online media, print media, television, radio etc. Due to factors such as the large variety of types of such advertising, and the desirability of considering various delivery aspects and other post trade aspects of such advertising etc. in trade decision making, electronic continuous trading systems for such inventories require capabilities well beyond conventional electronic continuous trading systems.

Figure 1:
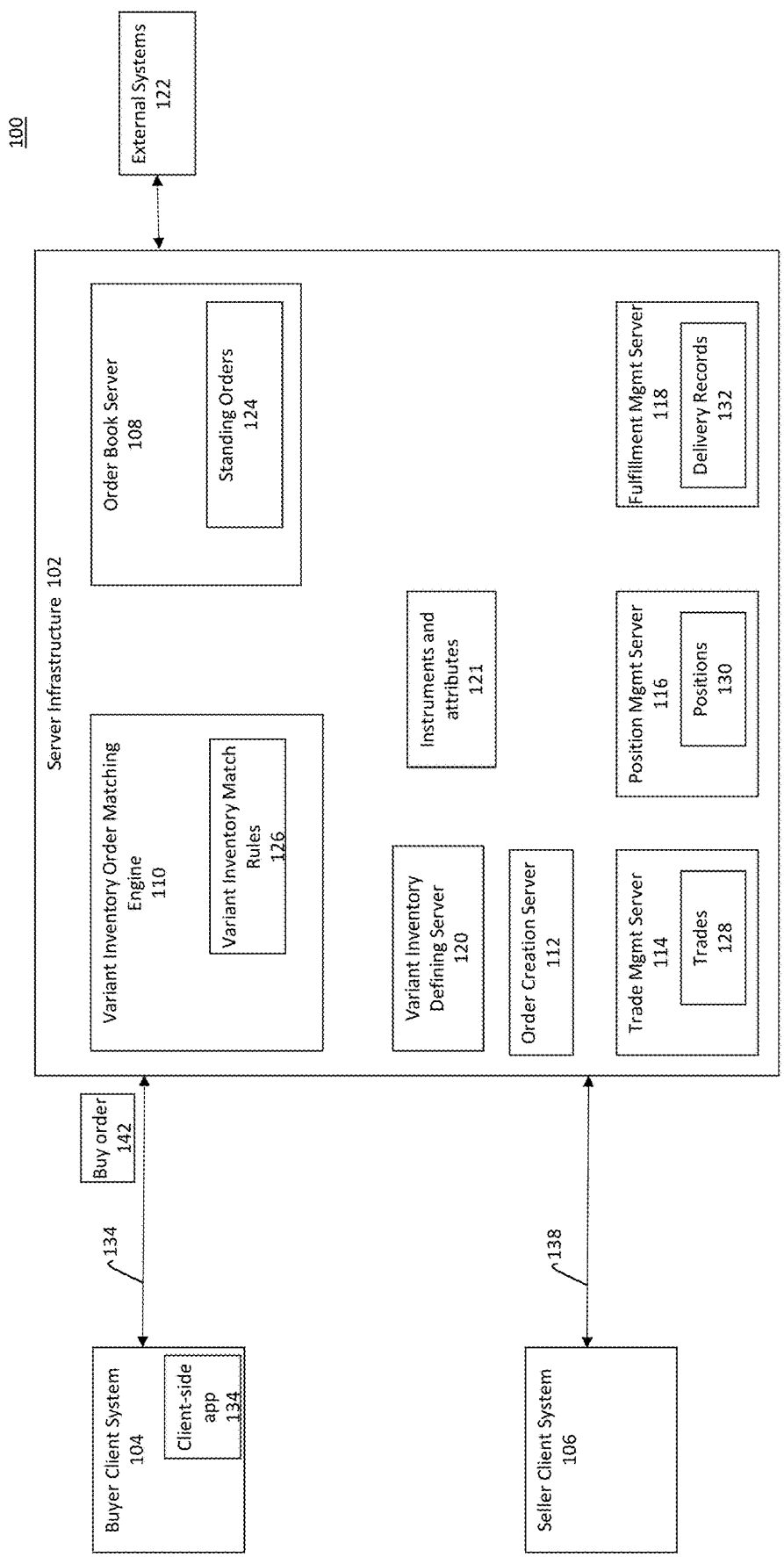
FIG. 1 illustrates a computing environment for electronically trading inventories, such as, but not limited to, highly variant inventories such as advertising, according to some example embodiments.
Figure 2:
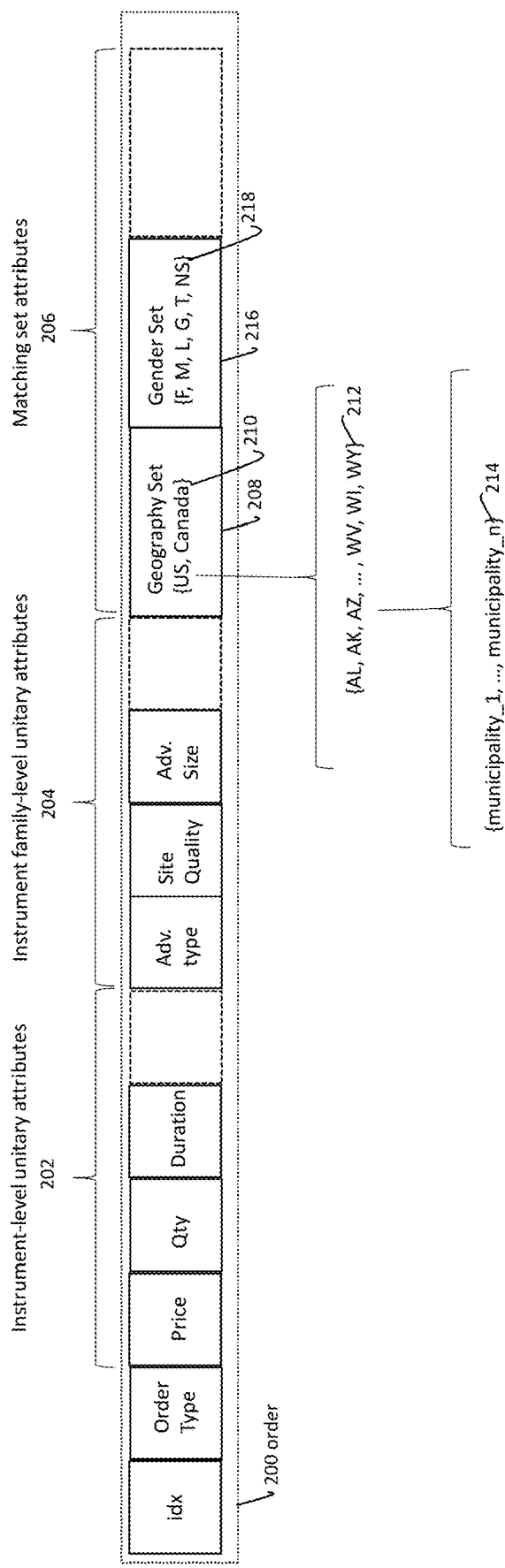
FIG. 2 illustrates example order data structure having different types of attributes, including unitary type attributes and set type attributes, according to some example embodiments.
Figure 3A:
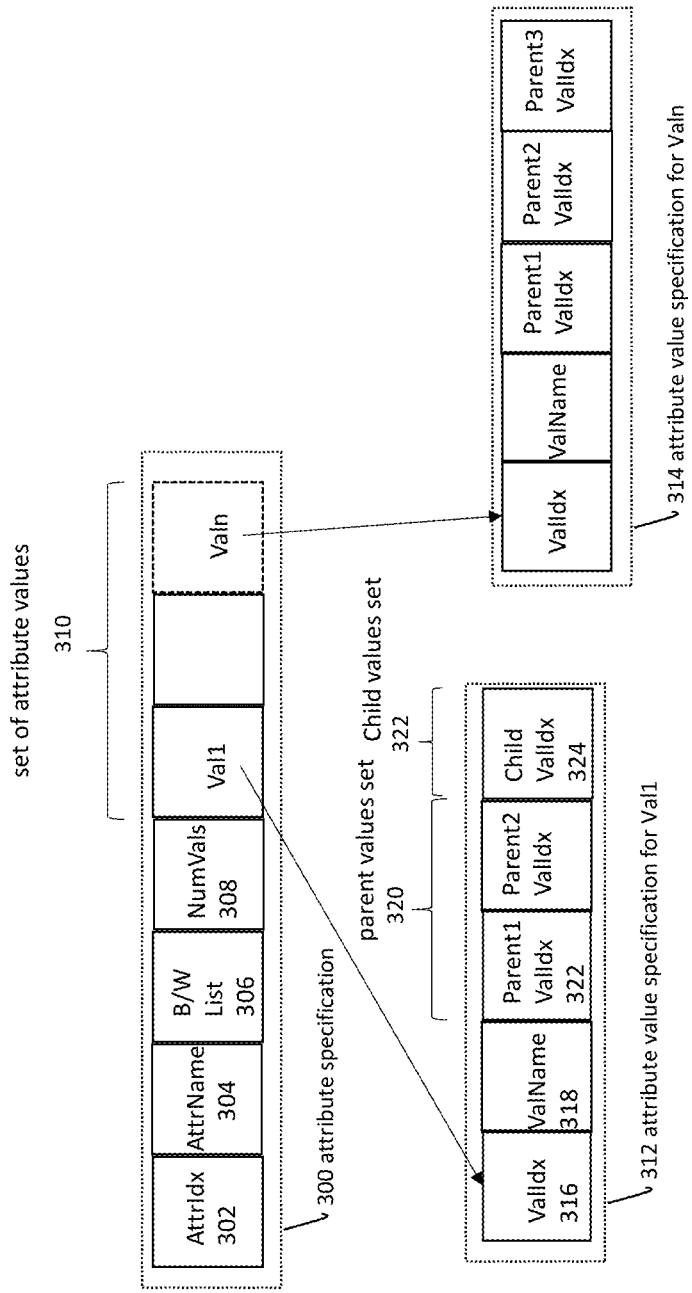
FIG. 3A illustrates an example attribute value data structure hierarchy, according to some example embodiments.
Figure 4A:
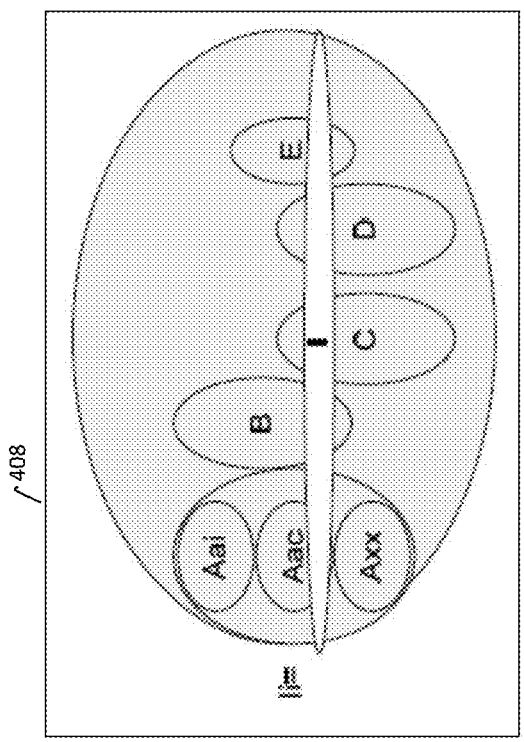
FIGS. 4A and 4B illustrate an example configuration of a tradable instrument with set-valued attributes according to some embodiments, for example, such as the tradable instrument of the order shown in FIG. 2.
Figure 6:
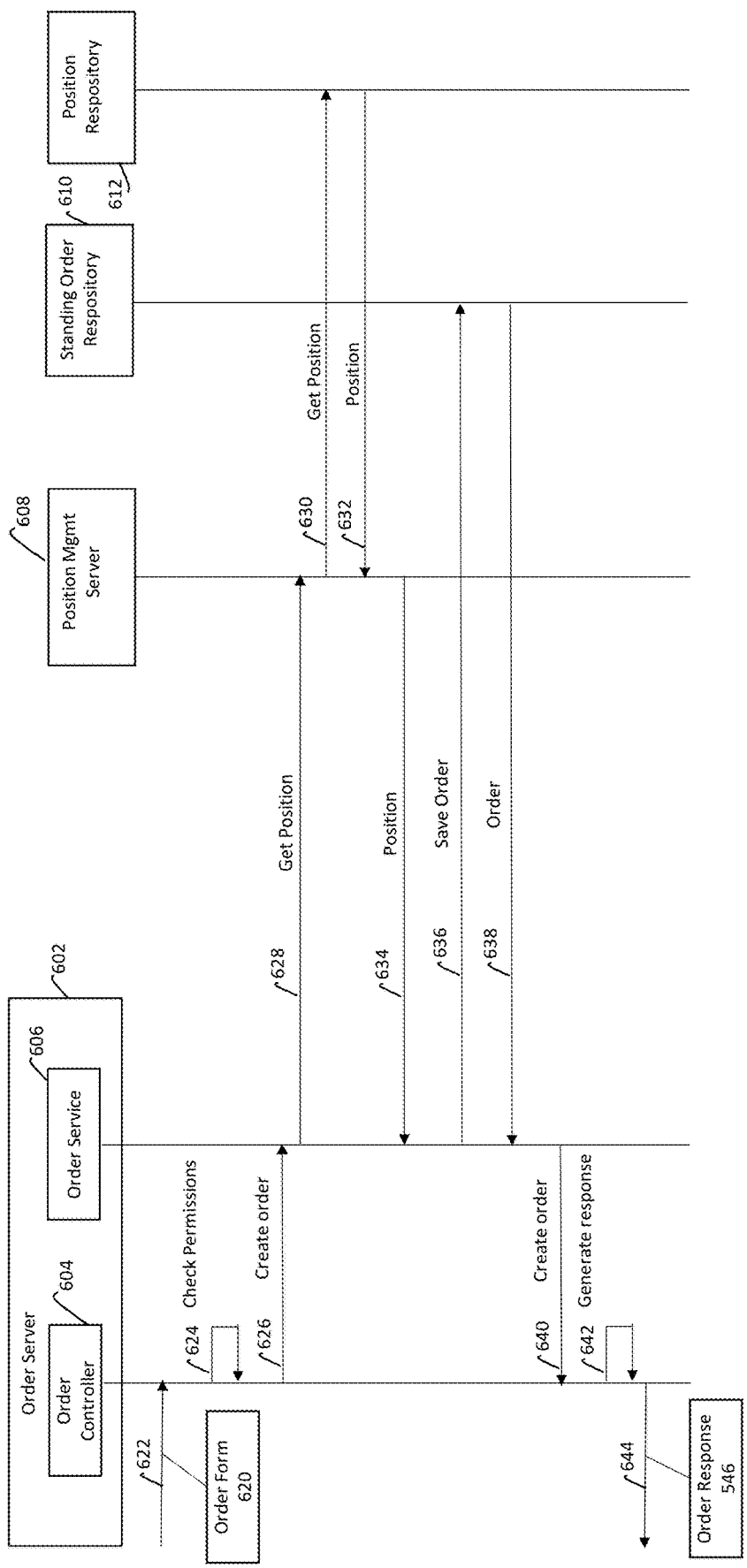
FIG. 6 illustrates an example sequence of operations for creating an order for an item or an inventory in the system of FIG. 1, according to some example embodiments.
Figure 7:
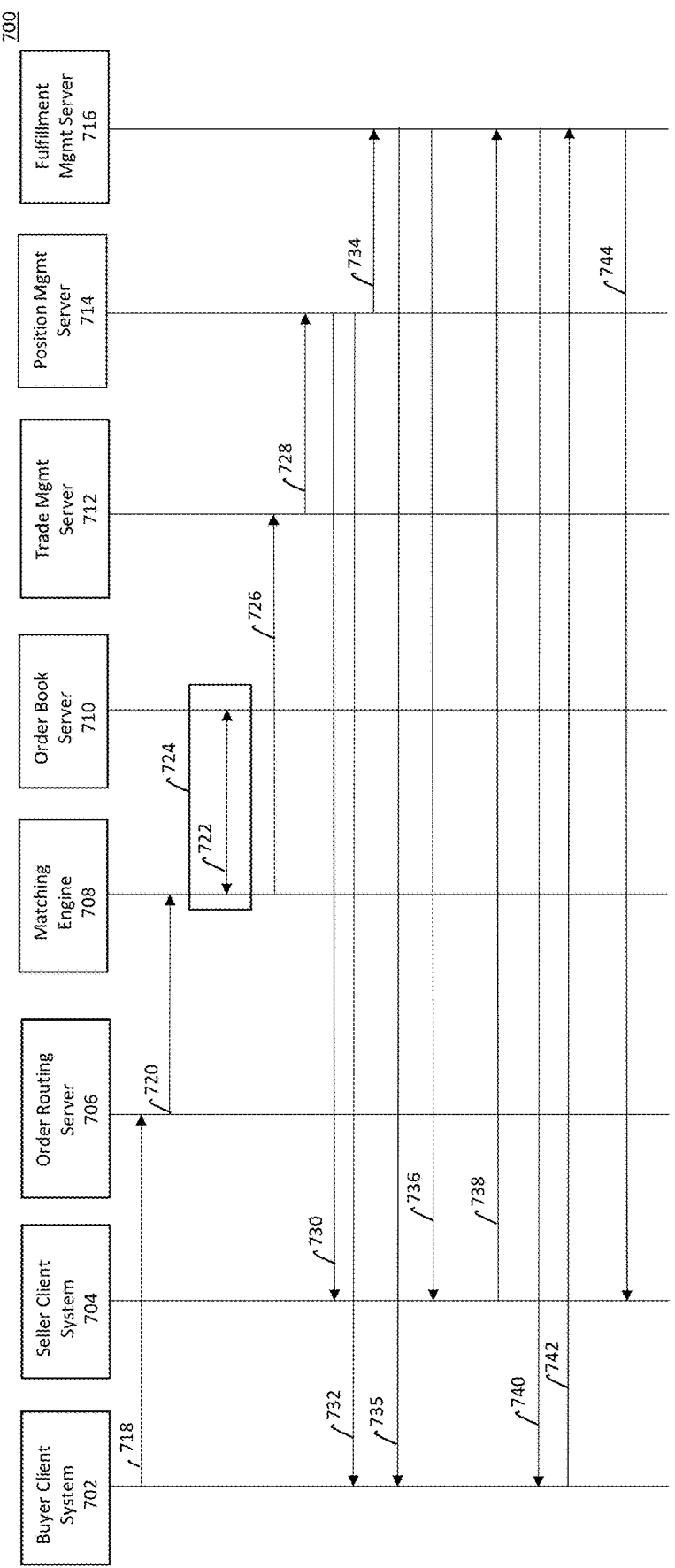
FIG. 7 illustrates an example sequence of operations for performing electronic trading for inventory items in the system of FIG. 1, according to some example embodiments.
Figure 8:
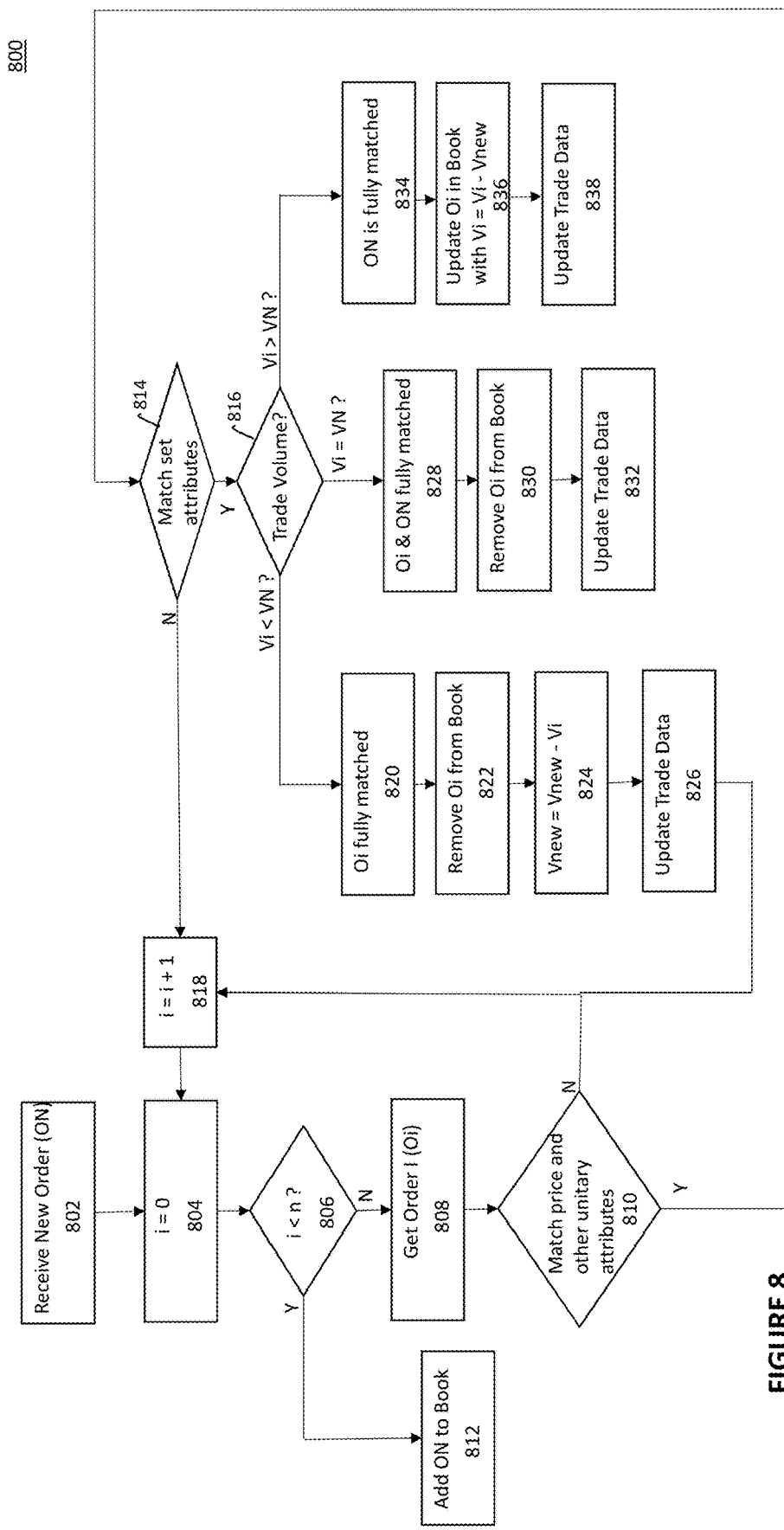
FIG. 8 illustrates an example flowchart for a matching process in the electronic trading of FIG. 7, according to some example embodiments.
Figure 9:
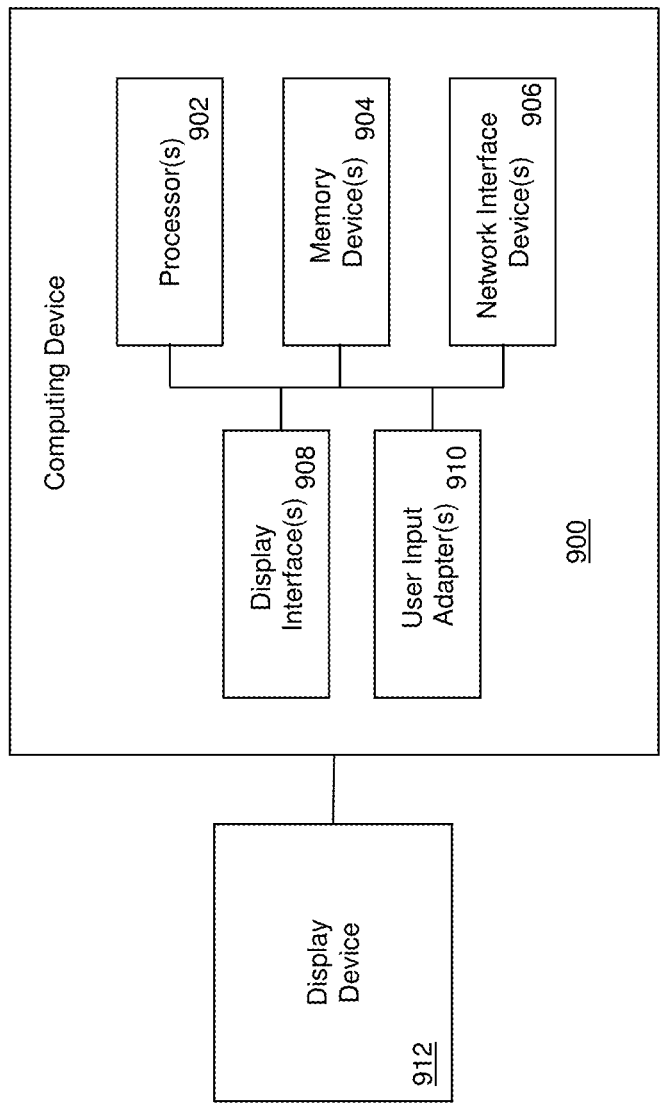
FIG. 9 schematically illustrates a computing environment in which the client systems and/or servers can be implemented, in accordance with some example embodiments.

FIG. 1 illustrates a computer environment for electronic continuous trading of variant inventories such as advertising futures and the like. The server infrastructure receives buy orders and sell orders for inventory items from client systems and processes the received orders to determine matches to identify potential trades satisfying mutual requirements of the buyer and seller. FIG. 2 illustrates an example order data structure for use in the electronic continuous trading environment of FIG. 1. The example order data structure is capable of efficiently associating different types of attributes, including unitary type attributes and set type attributes, with the same inventory. FIG. 3A illustrates an example attribute value data structure hierarchy for use with the order shown in FIG. 2. FIGS. 3B and 3C illustrate example attribute value encodings that improve efficiency of data storage and electronic trading. FIGS. 4A and 4B an example configuration of a tradable instrument with set-valued attributes, for example, such as the tradable instrument of the order shown in FIG. 2. FIG. 5A-5E illustrate several examples of matching between set-valued attributes in orders in the trading environment of FIG. 1. An example sequence of operations between a client system and the server during the creation of an order, such as, for example, the order in FIG. 2, is illustrated in FIG. 6. FIG. 7 illustrates an example sequence of operations to conduct a trade in the electronic continuous trading environment of FIG. 1, and FIG. 8 illustrates a flowchart for a matching process that can be used during the execution of the trade shown in FIG. 7. FIG. 9 illustrates a computer that can be used for implementing any of the clients or servers of FIG. 1.

Description of FIG. 1

FIG. 1 illustrates a computing environment in accordance with certain example embodiments. The non-limiting computing environment 100 includes one or more servers in server infrastructure 102 and client systems 104 and 106. The servers in server infrastructure 102 communicate with client systems 104 and 106, and one or more external servers 108, so that users on clients 104 and 106 can interact with an electronic continuous trading application executing in server infrastructure 102.

The computing environment 100 provides for electronic continuous trading of instruments of from an inventory of one or more tradable instrument families. In contrast to conventional electronic continuous trading systems that typically identify and match tradable instruments based on a few attributes, computer environment 100 is configured to enable the trading of instruments that may require larger numbers of attributes for uniquely representing the instruments and/or for matching between electronic trading orders (also referred herein as "orders"). The computer environment 100, while still capable of performing trades of instruments having few (e.g., 10 or fewer attributes), may be particularly advantageous with respect to highly variant inventories such as advertising futures and the like that require (and/or have) higher numbers of attributes (e.g., greater than 10, 20-30, etc.) and/or different types (e.g., unitary-valued attributes and set-valued attributes) of attributes in a unique descriptor ("token") for a tradable instrument.

Conventional electronic continuous trading systems are highly efficient for transacting large quantities of inventory in capital and commodity marketplaces. However, conventional electronic continuous trading systems are either incapable of, or are highly inefficient for, trading variant inventory. A primary reason for this difference is that most of such variant inventory, even within the same instrument families, are highly variant in terms of number of key attributes that may often be counted in dozens. For example, although capital and commodity market inventory, such as options inventory, is typically defined by a unique descriptor having just four attributes (e.g., attributes such as underlying asset, strike price, expiration date, and put/call flag), variant inventory such as advertising space inventory even when defined conservatively in some example embodiments may have at least 23 attributes. In addition, delivery of some advertising inventory may have heterogeneous, and often prolonged (e.g., up to several months for certain advertising inventory classes) delivery requirements, compared to just two single step delivery modes (e.g., cash or physical) in the financial assets such as stock swaps or commodity futures. In short, high variability of variant inventory and its delivery options create difficult obstacles in building electronic continuous trading marketplaces for trading such inventory.

Example embodiments provide for effective representation of variant inventories as tradable instruments, and efficient matching of such tradable instruments. Towards this end, example embodiments provide for the same tradable instrument to include different attribute types such as unitary-valued attributes and set-valued attributes, and also provide for set-valued attribute matching along with unitary attribute matching in the process of determining trades. A "unitary-valued attribute" can have only a single value or object specified as its value. As "set-valued attribute can have a set of one or more values or objects specified as its value. A "trade" (herein also referred to as a "transaction") between a first and a second order is identified when the first order is determined to match the second order (e.g., when a tradable instrument representing the first order is determined to match a tradable instrument representing the second order).

In contrast to some electronic batch trading systems in which trading orders are collected over a period of time and then executed in batches at intervals, electronic continuous trading systems are configured to attempt the trade of at least some types of trades on an ongoing real-time basis. For example, each trade order in a stream of incoming trade orders is immediately compared against the order book to determine a match. Example embodiments are configured to use data structures and matching techniques, and the like, that can efficiently process tradable instrument records that include more than 10 attributes and attributes that are of different types in large volumes (e.g., hundreds or thousands of orders per second) and in real-time time constraints (e.g., process the majority of incoming orders within 1 second).

Advertising futures is one example instrument family that can be traded in the computing environment 100. Although many of the embodiments described herein relate to trading of advertising inventory, this disclosure is not limited thereto.

Embodiments may provide electronic continuous trading for any type of tradable inventory, and, in many instances, are particularly efficient with respect to highly variant inventories. For example, the computing environment 100 may, in addition or alternatively to advertising inventory, provide for continuous trading of a variety of highly heterogeneous inventories such as, but not limited to, container shipment, stock swaps, "designer" CDOs, extended sets of oil and industrial chemicals varieties, FLEX options, reinsurance, food products, alcoholic or non-alcoholic beverages, mining products, paper and pulp products, automotive (e.g., fleet vehicles, tires) products, lumber and wood products, event management logistics, satellite services, and unstructured debt obligations inventories by creation of encoded unique and durable inventory descriptors (also referred to as "tokens") from a superset of exchange defined said inventory characteristics (attributes). It should be noted that embodiments are not limited to futures markets. Some embodiments may provide electronic continuous trading in spot markets. For example, certain inventory types in spot markets may require a high number of attributes in a corresponding tradable instrument. Buyers and sellers can state their firm trading criteria for such variant inventory instances, enabling their continuous electronic matching. Additionally, example embodiments, provide a technique for broadening the matching capabilities, thus enabling electronic exchange trading of a vast array of variant inventory instances by including data sets related to additional stipulations, for example, such as, fulfillment (delivery) obligations and the like, in to the trading decision tree.

Still further, the servers may also perform or otherwise engage in trades in non-variant instrument families such as equities, debt, futures other than advertising futures, options, repos, and the like. As noted above, non-variant instrument descriptors may include only some of the attributes that must be matched by the trading system. Equities are typically traded by price, and each equity instrument is associated to its issuing participant (e.g., company for which the stock is issued). Debt instruments can be traded on price and/or yield. Various futures and options are typically traded by price and features related to the underlying inventory (e.g., asset). Repos instruments may be traded by yield, duration and features of the underlying asset.

When operational and performing electronic continuous trading of advertising futures, the server infrastructure 102 may operate to receive buy orders and sell orders from client systems 104 and 106 for advertising instruments. The server infrastructure operates to determine matching trades among the buy orders and sell orders, to update its inventory records, and to inform other systems regarding the executed trade so that the delivery etc. can be tracked.

Server infrastructure 102 may include one or more physical server computers that are communicatively connected to each other over a network. The one or more physical server computers may be geographically co-located or distributed. Server infrastructure 102 may include an order book server 108, a variant inventory order matching engine (referred to simply as "matching engine") 110, an order creation server 112, a trade management server 114, a position management server 116, a fulfillment management server 118, and a variant inventory defining server 120. Although shown in FIG. 1 as them all being located in the same server infrastructure 102, the respective servers 108-120 may each be in a separate physical server or distributed in any other combination among two or more interconnected physical server computers. Moreover, in some embodiments, respective servers of server infrastructure 102 may be controlled by different administrative entities. The interconnection between servers in server infrastructure 102 may be via the Internet or over some other network such as a local area network, a wide area network or point-to-point connections with each other. In some example embodiments, one or more of the servers may provide an interface (e.g., an application programming interface—API) which can be used by other servers in server infrastructure 102 and/or external computers to interact with it. For example, one or both of the variant inventory order matching engine 110 and order book server 108, which are used in the real-time continuous order matching process, may communicate with each of the other servers in server infrastructure 102 and/or external computers 104 and 105 via APIs. In some embodiments, functions of respective servers illustrated in server infrastructure 102 may be combined into one server, or another grouping of servers, some functions may not be implemented and/or additional functions may be implemented.

Server infrastructure 102 may also communicate with external servers 122 which provide various services. For example, one or more external servers 122 may provide monitoring and/or surveillance of the electronic trading on server infrastructure 102 in order to ensure regulatory compliance or the like by detecting abnormal events and reporting/alerting relevant systems and/or users of such abnormalities. Some external servers 122 may subscribe to receiving trade and/or order information from the server infrastructure 102.

Order book server 108 operates to store and maintain active orders of tradable instrument inventory of one or more tradable instrument families, and includes a database of stored orders and processes for managing stored orders. An instrument family is a generic term for a set of financial securities or other inventory type with same characteristics, e.g. 10 year bonds, 180 day treasury bills, or ordinary shares. In some embodiments, orders for each instrument family or instrument type is stored in a respective order book database or database table 124.

The order book database 124 may store the orders in a manner that is optimized for efficient storage and/or efficient matching. In some embodiments, respectively different instrument families are stored in respective databases or database tables as matching is performed among instruments in the same family of instruments. In addition, or alternatively, buy orders and sell orders may be stored in separate areas so that lookup operations (e.g., search) during matching is more efficient and faster. According to some example embodiments, the stored orders each represent an order associated with a quantity of a particular tradable instrument. For example, if server infrastructure 102 trades equities, then an example instrument family may be that of all common stock equities, an example instrument may be the stock of a company A, and an example order in the order book would pertain to some quantity of stock of company A. In example embodiments in which server infrastructure 102 trades variant inventories, the order book data structures may be configured for optimal storage and access of orders including such variant data.

The order book database 124 may be continuously monitored by one or more processes. For example, the database may be monitored to ensure that the stored orders are correctly marked as active. Depending on the type of order (e.g., orders with time limits), an order may be deactivated or removed when it remains in the database beyond a certain duration. The database may also be monitored to ensure that incoming orders are traded within the real-time or near real-time (e.g., within 10 seconds) time constraints. Surveillance programs, and the like, too may monitor the order book database to obtain a view of current market conditions. The capability to specify tradable instruments with list attributes, and to have such tradable instruments processed through the order book database 124, provides reduced liquidity segmentation in markets, enforces a high level of standardization, ensures durability of tradable instruments over time, and enables accurate (e.g., "apples to apples") comparisons for historical price tracking.

Matching engine 110 operates to match each incoming order 142 with orders from the order book database (also referred to as "standing orders database") 124. For example, matching engine 110 may operate to match an incoming buy order 142 with one or more sell orders stored in the order book database 124, or to match an incoming sell order 142 with one or more buy orders stored in the order book database 124. As described below in relation to FIG. 8, the matching technique may involve matching based on unitary attributes and then matching on set attributes. The matching may be performed in accordance with one or more matching rules from a matching rules database 126.

The matching rules database 126 includes one or more rules that can be applied by the matching engine. The rules may be arranged according to a priority in which they are to be applied. The rules may specify a priority ordering between matching of different attributes, mandatory and/or conditional match attributes per instrument family, and the like. For example, a group of matching rules may specify that an incoming order is first matched in accordance with the instrument type and instrument family, then price, then one or more set attributes, and then on quantity. In another example, where the instrument type relates to advertising or the like with particular delivery quantity constraints, the matching rules may specify that quantity is compared before a set-valued attribute for delivery duration. In some example embodiments, some rules may specify that an order quantity should be considered matched if and only if it could produce a value equal or less than contra-order's specified quantity, unless the inbound order is ALL_OR_NONE (AON), in which case orders are considered matched if it results in full execution of an inbound order. Other sets of rules may specify, for example, that: in the case of discretionary orders, a regular price matching is augmented by price adjustment as per discretionary value (% or delta) specified in an order; that, in the case of pegged/discretionary orders, a regular price matching is augmented by price adjustment as per discretionary value (% or delta) related to index, another instrument or assets' basket specified in an order; and/or that, in "combo" orders, an order is not considered matched unless each leg is matched successfully or entire order quantitative thresholds are met, i.e. individual legs matching rules can be superseded by "combo" order matching rules.

Order creation server 112 operates to enable client systems to create and submit orders to server infrastructure 102. A web interface may be provided to client systems 104 and 106 by which users can create and submit orders. Order creation server 112 may also provide for configuring (e.g., in combination with 120 and/or 121) system specified attributes that are then used by users to create the orders on the client systems 104 and 106.

Trade management server 114 receives trade information from the matching engine 110. The received trade information, for example, information regarding completed trades may be stored in a database 128 of trade records. An ongoing record of the trades performed by the matching engine may be maintained in database 128.

Position management server 116 maintains position information regarding all instruments. As trades are executed in the matching engine, the position management server 116 may update its positions database 130 with the current positions. Positions management server 116 may also communicate with the trade management server and fulfillment management server to update the positions after completion of respective trades.

Fulfillment management server 118 maintains and keeps track of fulfillment and delivery of completed trades. As described in relation to FIG. 8, the fulfillment management server may communicate within the server infrastructure and also externally with the client systems in order to monitor buyer and seller delivery obligations with respect to trades made in the matching engine. As also described above, certain delivery requirements and/or commitments may be included in the corresponding tradable orders.

Inventory descriptor server 120 provides for configuring system-specified inventory descriptors (also referred to as inventory tokens or tokens) and attributes, and may provide an interface by which an operator configures new instruments types, instrument families, and/or attributes of various system specified inventory descriptors. In some embodiments, a user interface such as that described in relation to FIGS. 4A and 4B may provide a user with the capability to define inventory descriptors ("tokens") for one or more instruments.

Instrument families, instruments and certain attributes that may be used in instrument descriptors and/or orders may be stored in instruments and attributes database 121. In example embodiments, in order to provide the flexibility necessary for trading variant instruments, users and/or operators may be provided with the authority and capability to create new instrument families, new instruments, and/or new attributes, that are then stored in database 121 for subsequent use in orders. The stored attributes may be categorized into at least three categories: instrument family level attributes, matching list attributes, and instrument level attributes. Instrument family level attributes are defined per instrument family. Matching list attributes provide for specifying the values for those attributes as sets of values. Instrument level attributes are specific to a particular instrument. Further description of the different attribute types, and their use, is provided in relation to FIG. 2 and other drawings below.

The communication between the servers 102, clients 104-106, and external servers 120 may be over the internet or any other communication network 134 and 138. In some embodiments the network interconnecting servers 108-118 may be the same as the network to which the client systems 104-106 connect.

One or more of the servers 108, 110, 112, 114, 116, 118 and 120 may execute an application designed and operated according to a three-tier model of a web server, application server and database. As in conventional systems, the web server of each web application 112 includes the capability to communicate with external entities via HTTP and other protocols such as JSON, HTML, XML, JavaScript, Cascading Style Sheets (CSS), etc. The application server of any of the above applications implemented as a web application may provide the processing logic for the application.

Any of the above mentioned applications may interact with an enterprise service application (not separately shown) for managing user authentication, with clients 104-106 for receiving incoming orders from and for transmitting order/trade confirmations, and database management systems (e.g., databases 121, 124, 126, 128, 130, 132, etc.) and/or external servers 122 for obtaining information to be used in the processing or to report information regarding orders, trades and positions, as well as market statistics.

One or more of the servers 108, 110, 112, 114, 116, 118 and 120 may operate to receive requests from clients 104-106, perform processing and/or obtain information from the databases 121, 124, 126, 128, 130, 132, etc., and/or external servers 122, and respond to clients 104-106 with a result from the processing and/or obtained data. Any of the applications 108, 110, 112, 114, 116, 118 and 120 may utilize a common enterprise service application (not shown separately) for administering users, entitlements, user sessions and/or external server sessions, and the like.

An application, such as any of servers 108, 110, 112, 114, 116, 118 and 120, may comprise one or more client-side components and one or more server-side components. Client-side components of an application may operate to provide for handling the user interface by performing presenting (e.g., displaying) of information on a user interface device; receiving user input, etc. Server-side components may provide for authentication, service metering, generating or obtaining information to be presented to the user in accordance with received user inputs.

The databases 121, 124, 126, 128, 130, 132, etc., may utilize database management systems, which may be commercially available DBMS, or other data record management system. In some embodiments one or more of the databases may be based upon block chain technology. Although shown as multiple databases, in some embodiments databases 121, 124, 126, 128, 130, 132, etc., may be formed as a single DBMS. Embodiments are not limited to any type of database management system.

Example clients 104 and 106 can be configured to execute the same or different client applications. The client applications may include a trading application. In the illustrated example of FIG. 1, client 104 is executing a trading application and transmits a buy order through that trading application. Client 106 may execute the same or different trading application, and may transmit a sell order to server 102.

Clients 104 and/or 106 may include other applications in addition to the trading application. In the illustrated example embodiment in FIG. 1, client system 104 includes a web browser. Client 104 may also have stored on it a client-side app which is a native app. When the browser is used to access a web application or, client-side code 134 for a web application from server 108, 110, 112, 114, 116, 118 and 120 executed within the browser. The client-side code and apps may perform client-side processing for a corresponding web application on server infrastructure 102.

Clients 104 and 106 may include any of personal computers, mobile computers, tablets, smartphones, and other electronic devices. In some example embodiments, any electronic computing device including at least a display, an input device for user input, and a communication interface for communicating with the server device may operate as a client device. Although two client systems are shown, any number of client systems may interact with server infrastructure 102.

It should be understood that the software modules shown in FIG. 1 are stored in and executed by hardware components (such as processors and memories), and it should be further understood that, whenever it is described in this document that a software module performs any action, that is done solely for ease of description, and the action is in actuality performed by the underlying hardware according to the instructions and data that comprise the software module. Further details regarding example hardware components that may be used to implement the features described herein are provided below with reference to FIG. 9, as well as in other places in this document.

In many places in this document, including but not limited to in the above description of FIG. 1, software modules and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 9.

Description of FIG. 2

FIG. 2 illustrates an example representation of an order 200 in accordance with some example embodiments. The illustrated order 200 is a logical representation of an order that may be stored in the order book database 124 for electronic continuous trading of advertising futures.

Order 200 may comprise instrument family level attributes 204, match list attributes 206, and instrument level attributes 202. Instrument family level attributes 204 uniquely identify an instrument family. The instrument level attributes may be selected so that the instrument family level attributes and instrument level attributes uniquely define an order, and, in some embodiments, are mainly selected to facilitate the generation of durable asset group and family descriptions, as well as for minimizing the use of set attributes within an instrument.

Instrument level attributes 202 in the order 200 may include attributes such as, for example, ad delivery duration (the period over which the ad will be run, e.g., week, day, month, etc.), ad start date (e.g., yymmdd), ad pacing (interval at which the ad will be run, e.g. daily, every Friday and Saturday, etc.), cost type (e.g., CPM, CPC, CPA), count vendor (third party vendor providing ad count statistics), fraud vendor (third party vendor providing ad fraud statistics), viewability vendor (third party vendor providing ad viewability count statistics), delivery quality (third party vendor providing ad quality statistics), criteria, data vendor (third party vendor providing data for the ad), and a trade type (e.g., combo orders: complex orders allowing simultaneous execution across plurality of instruments, and/or markets; directed orders: orders to be executed only with specified party; discretionary orders: orders allowing execution at prices differ from stated order price (+/− discretionary amount); iceberg (hidden) orders: orders allowing concealment off full order quantity; limit orders: discretionary orders with a specified execution price limits; market orders: orders executed at the best price available during their lifecycle; preferencing orders: orders to be executed first against preferred contraparties before considering the rest of standing orders (incisive) or preferred parties only (exclusive); pegged; discretionary; stop; permutations of two or more of the above categories; etc.).

An order duration (e.g., immediate: attempt to match and then withdraw any remaining quantity immediately from the order book database (this includes fill or kill, fill and kill and standard market orders); day: the order is valid until close of the trading day on which it was entered, and is withdrawn at the end of the day; good till cancel (expiration): the order is valid until the maximum date specified by the trading system, etc.), an order contingency classification (e.g., none: fill any amount of the order; fill or kill (FOK): the complete order quantity must be filled as soon as it becomes available on the market, otherwise the order is withdrawn; fill and kill (FAK): fill any amount of the order as soon as it becomes available on the market and then the order is withdrawn immediately, etc.), order price classification (e.g., limit: limit orders have a price limit which ensures that the orders will be traded at prices equal to or "better" than the limit price (A buy limit order signifies that the order will be matched at a price equal to or less than the limit price. A sell limit order signifies that the order will be matched at a price equal to or greater than the limit price. The trade price is determined by the passive limit orders. Limit orders match with passive orders on the other side of the book); market: no price is specified on a market order (Market orders cannot rest in the order book. The trade price is determined by the passive limit orders. Market orders match with passive orders on the other side of the book and then any remaining balance is cancelled. If there are no orders on the opposite side of the Order Book the order is rejected.), etc.), are some other example instrument level attributes.

Price and volume are also attributes that must be specified for each order (except market, where only volume is required), and may be considered as instrument level attributes, or may be considered outside of the instrument level (e.g., order level) and instrument family level attributes. For a sell order, the price refers to the offer price for the sale, and the volume attribute specifies the quantity of the inventory that is being offered for sale. For a buy order, the price attribute specifies the desired purchase price, and the quantity specifies the desired amount of the inventory.

Instrument family level attributes 204 may, for example, include one or more of site quality of the advertising (e.g., class of add site: any, premium, regular, remnant, C10, C25, C50, C100, C200, C400, C500, C1k, C2.5k, C5k, Group 1, Group 500, Site 1, Site 1m), primary Interactive Advertising Board (IAB) category, IAB subcategory (e.g., art, blog, education, email and communication, fashion & beauty, financial services/banking, games, health, humor, news, politics, real estate, school/university, social media, sports, television, travel, any, air, lodging, cruise), ad type (e.g., banner-display, banner-mobile (app+web), digital video, banner digital (desktop and mobile), mobile app, mobile web, video-nonspecified, video-set top, video-linear TV, video-on demand, video-mobile, video-digital (web desktop only), video-digital (web mobile only), video-digital (all mediums), native), out-of-home (digital and traditional), ad size (e.g., any, 728×90, 300×250, 180×150, 160×600, 300×600, 600×250, 550×480, 970×90, 970×250, 300×600, 300×1050, 120×60, 88×31, vid-large, vid-med, vid-small, native, native), geography, device platform, language, viewability standard, data segment, gender, age, marital status, household income, education, interest category, frequency capping, etc.

The order 200 includes, in addition to an order index and an indication whether the order is a buy order or a sell order, instrument level attributes 202, instrument family level attributes 204 and matching list attributes 206 arranged in logical relation to each other.

Matching list attributes 206 may include one or more of gender, marital status, education level, geography, ad size, IAB creative attributes, publisher sites, display creative (e.g., tiling), pacing, brands, and ad channel. In an example embodiment, matching list attributes may each permit specifying a set of values as the attribute value. For example, the matching list attribute gender for specifying a target audience for an advertisement in an order may allow specifying one or more of male, female, male or female, male and female, transgender, etc. In contrast to matching list attributes 206, the instrument level attributes 202 and instrument family level attributes 204 may all be unitary-valued attributes.

Matching list attributes may be metadata that is used to further categorize instruments represented in orders. Embodiments may provide a common structure (e.g., common structure per instrument type or instrument family) allowing the specification of metadata in an order at order entry time. The generic mechanism may allow multiple sets (or lists) to be specified for each order. These sets may contain a generic set type identifier, type of set (e.g., black, defined or white list), and a set of attribute values.

In the illustrated example in FIG. 2, a geography attribute and a gender attribute are specified as matching list attributes. The geography attribute may be specified in a geography field 208 as one of the matching list attributes 206, and may specify the geographic regions to which this advertisement futures order applies. A single value or multiple unitary values may be specified in the field 208 to specify the geographic selections applicable to the order.

The geographic attribute may be specifiable at multiple hierarchical levels. At the highest level, the set 210 of values may include US and Canada. At the second level, a first subset 212 may correspond to the respective states of US, and a second subset (not shown) may correspond to the respective provinces of Canada. At a third level, each state or province may be represented by a respective subset 214 one or more of its counties/municipalities. In this manner, a hierarchical set-subset relationship may represent geographic areas to a desired level of granularity (e.g., capable of specifying a smallest definable geographic area up to the largest area in which a common set of parameters apply to advertising being traded). The matching process may be capable of recognizing the hierarchical relationship between values. Thus, during matching, even if a first order that specifies a particular attribute in first hierarchical level values is compared to a second order listing the particular attribute in second hierarchical level values, the matching process may be able to determine intersects between the values of the two orders.

Thus, in respective example orders related to an advertising campaign targeted to New York City, Arlington and Baltimore, the field 208 may include the any of the sets of attribute values {US} specifying the geographic selection with a value from the first level of the hierarchy, {NewYork, Virginia, Maryland} specifying the geographic selection with values from the second level of the hierarchy, or {NewYorkCity, Arlington, Baltimore} specifying the geographic selection with values from the third level of the hierarchy. Of course, only the last set identifies the target geographic areas with exactly the desired precision, but the first and second sets too have the target areas as one of their subsets and thus satisfies the basic requirement of including the targeted areas.

Example embodiments may also provide for specifying attribute values from multiple levels of an attribute value hierarchy in the same set of values. For example, the set 210 of geographic regions specified for geography field 208 may be {NewYork, Virginia, Baltimore} where some attribute values are from a second level of the hierarchy and one value is from the third level.

Thus, some embodiments, by providing for attribute values from multiple levels of an attribute value hierarchy to be specified as values in the same set of values, enables the geographic area relevant for the order to be specified with accuracy and with a minimum number of attributes. For example, if the ad order is associated with two states, with all (e.g. 8 out of 8) counties in the first state being targeted, but only 5 out of 10 of the second state are targeted, then the first state may be specified with the attribute value identifying the first state, and the second state may be specified by the individual counties being targeted. Thus, instead of having to specify 18 attribute values at the lower level of the attribute value hierarchy, the above example illustrated specifying 6 attributes to still accurately identify the target geographic region using multi-level attribute values.

Multi-level attribute value capability for the same attribute, in addition to providing the advantage of reducing storage space in memory, may also reduce the processing effort and time for comparing sets during the matching process. For example, in the above example, the number of attribute values to be matched is reduced from 18 to 6.

Some matching list attributes may not be configured in the system as having a multi-level value hierarchy. For example, FIG. 2 also shows a gender field 216 as a part of the record 200. The gender field may include a set 218 of values comprising one or more of F (female), M (male), L (lesbian), G (gay), T (transgender), NS (not specified). The system may not dissect these categories further, and thus, while the gender field 216 may specify multiple values, all the gender values specified may be considered at the same level of a value hierarchy. Thus, in contrast to the geography field 208 which includes attribute values from multiple levels of its attribute value hierarchy, the gender field attribute values are uniformly from the same level of its attribute value hierarchy.

The combination of instrument family attributes and matching list attributes provide a way for buyers and sellers to describe complex multi-variable assets, and to enable the matching of buy and sell orders off of intersects and overlaps between value sets. Further capabilities of having respective attributes being specified with values of different granularities (e.g., such as geography field 208 and gender field 216), and/or having attribute values from multiple levels of the attribute value hierarchy in the same set of attribute values (e.g., such as described above in relation to geography field 208), provide additional flexibility in describe assets and to perform matching between records. Further, having the capability to define attribute and/or value subsets flexibly, enables a wide variety of participants who have widely differing needs and requirements.

The matching set attributes are primarily used for specifying delivery, other business and/or inventory characteristic related constraints. However, some delivery, other business and/or inventory characteristic related constraints may be specified using unitary-valued attributes. A major distinction between the instrument attributes and the appendage clause for delivery, other business and/or inventory characteristic related constraints is that the former represent firm compendium of unitary values of inventory delineators that determines inventory unit, typically having major effect on potential contract price, while the latter sets forth stipulations (e.g., delivery or other business-related), having much lesser effect on price.

Each order and its data structure(s) may be configured in order to minimize the storage space used by the order book database and/or to speed up access to the orders during lookup/search operations. For example, the matching list attributes of an order may be linked to the rest of the order (e.g., the part of the order record with the non-matching list attributes) by one or more pointers. This may facilitate storing the matching list attributes separately in physical memory from the rest of the order. This may also facilitate retrieving the matching list attributes of an order during the matching process only if the non-matching list portions of the order is matched, thus in many cases avoiding the additional time and the excess memory bus traffic that can be caused by retrieving matching lists corresponding to each and every order that is used in a comparison during matching.

While inclusion of set data (e.g., arrays) in an instrument body is not precluded, in certain embodiments the use of sets is limited exclusively to an appendage to the instrument for reasons, such as, data processing efficiency, workflow optimization and marketplace efficiency. Set or array matching requires significantly greater data processing overhead.

Therefore, it is usually more efficient to match unitary-valued attributes first and attempt to match arrays only after unitary-valued attributes are matched successfully. Since inventory characteristics and trading interest (price and quantity) are in a majority of variant inventory trading scenarios, and are often the primary trading decision drivers and more or less fixed, while business and delivery stipulations usually more flexible and of lesser importance in pricing formation, it is more advantageous for traders to scrutinize such data first prior to turning their attention to business considerations. Without the use of arrays in inventory description, being limited to unitary attributes for certain variant attributes could lead to a large expansion of tradable instrument universe causing a significant and unnecessary liquidity segmentation, as well as overall user interface sluggishness. The capability to include lists of buyer and seller business (e.g. delivery) requirements and match them electronically may be a must for electronic trading of non-structured, highly variant inventory allowing participants select inventory meeting their needs and make sure it is delivered where and when they need, assures that only trusted data, quality assurance or delivery providers are involved in delivery fulfillment, and/or that their competitive advantage are not jeopardized.

For the advertising industry, the use of appendages to instrument descriptors (as part of the order data structure or as data associated with the order data structure via a pointer or the like) in accordance with embodiments will allow timing of ad delivery to, e.g., Christmas Day, Super Bowl or a movie release; not have ABC company's ad to appear on a competitor BCD company property, or save cost and embarrassment of advertising super luxury indulgences and alcohol on a religious website. Similarly, oil refiners or chemical plants may avoid receiving deliveries during routine maintenance periods without contract segmentation, etc.

While these kind of needs might be, at least to some extent, met by conventional binary matching used in currently existing trading exchanges, creating a unique security for each possible permutation would result in millions of inventory types (billions or even trillions for options or futures with flexible expiration schedule), and complexities of combining up to hundreds of them into complex orders, like "combo" orders. Even if current computing infrastructure could allow such a solution, traders will be faced with enormous market fragmentation with mountains of BBOs, individual orders, and back end offices with millions of individual trades and positions required to be reconciled. An explosive growth in the number of instruments, while leading to market segmentation and the like, may also make real-time performance of trades on electronic trading systems more difficult and/or impractical due, for example, to excessive search times and memory requirements. Use of matching lists allow a very significant reduction in data, storage, processing and communication overhead by encoding textual or large format numeric data into integers or bit stream cluster. It minimizes order routing, market data dissemination and interactive access data streams (e.g., orders, trades and or positions retrieval), allows matching engine to avoid string or long word matching and minimizes storage overhead for orders, trade, and positions leaving decoding to user interface support environments. In addition, such encoding allows flexibility and ease of introduction of additional data types processing, such as bar or radio frequency identifier (RFID) codes, audio, pictures, video, etc.

Description of FIG. 3 (FIGS. 3A, 3B and 3C)

FIG. 3A illustrates a logical view of example data structures that may be used to implement matching of attributes including set attributes, according to some example embodiments.

Data structure 300 is an example matching list attribute (also referred to as set attribute) data structure, which may be used to specify an attribute in order 200 described above. Data structure 300 may include a unique attribute identifier 302, an attribute name 304, a type identifier 306, and the set 310 of values. In some embodiments, the number of attribute values 308 may also be included in the attribute specification.

The attribute identifier 302 uniquely identifies the attribute within the system. For example, each attribute identifier may be unique in the computer environment 100 shown in FIG. 1. The attribute name 304 specifies another identifier for the attribute, for example, to more easily (than with merely the index) identify the attribute as to what it stands for.

The attribute type identifier 306 identifies the attribute as a unitary attribute, a defined list attribute, blacklist attribute, or a whitelist attribute. It may also identify, in the cases of a whitelist or blacklist attribute, whether it is buyer controlled or seller controlled.

An attributes specified as unitary-valued attribute (i.e., unitary-type attribute), permits only a single value to be specified as the attribute value.

Each list attribute permits a set of one or more values to be specified. A defined list for an attribute in an order specifies a set of none, one or more values that must be matched to corresponding attributes in other orders, to determine a match in terms of intersects and overlaps in the respective sets. A white list specifies a set of values that can be in any set of values in a matching record. A black list specifies a set of values, any of which must not be included in any set of values in a matching record. When the attribute is configured to have a buyer controlled whitelist, then the matching process may ensure that all entries in the matching set of values are in the buyer's whitelist. If the attribute specifies that the whitelist is seller controlled, then the matching process may ensure that all entries in the matching set of values are in the seller's whitelist are. The buyer controlled blacklist, ensures that the matched set of values does not include any values in the buyers blacklist. The seller controlled blacklist, ensures that the matched set of values does not include any values in the seller's blacklist. By allowing the whitelist and/or the black list to be specified either as buyer controlled or as seller controlled, example embodiments enable a high level of flexibility and accuracy in specifying attributes to be matched.

Depending on the type of tradable instrument and requirements of the instrument such as time requirements (e.g., timed order), one may decide to have a particular attribute specified either as multiple unitary-valued attributes or a single list attribute. For example, a gender requirement may be specified by several unitary-valued attributes such as "M" (male only), "F" (female only), "MF" (male or female) or "NS" (not specified), or as a single set-valued attribute such as an attribute with the set of values {M, F, MF and NS} in an instrument descriptor. In some embodiments, given the set of values for a particular attribute as input, the processor may make the determination of unitary-versus set-valued for that particular attribute. The determination to choose unitary-valued attribute over set-valued attribute in this example, may be based upon whether the time overhead caused by having a larger number of instruments (e.g., a separate instrument type for each of the above unitary values) is greater than the time overhead of set comparison for the above set values, and/or whether either time overhead might cause the matching process to fail any time constraints for the particular type of order. While it is not common, for some high variability inventory asset classes it is sometimes difficult to resolve main inventory characteristics as unitary values or even a predefined manageable set of ranges. In such cases, the most optimal solution may be to use the matching list approach of example embodiments, allowing buyers/sellers to request exchange to add required ranges if necessary for listing new instrument families. An illustrative example of such inventory is crude oil. One of the most important petroleum assay (chemical composition) characteristic is API Gravity ranging from under 850 to over 1000 kg/m3. While crude oil of the same brand might have a significant API Gravity variation, the API Gravity controls refining effectiveness and delivery options, therefore it is a major price formation parameter.

Each attribute 310 may be associated with one or more values. For each attribute value 310, the record 300 may include at least a value identifier. The value identifier may be an index or a pointer by which a record for a particular value can be identified.

The number of attribute values 308 may be used by the processor to process as many values that are configured for the attribute. In some other example embodiments, the number of attribute values 308 may not be necessary, and the processor may instead rely upon identifying individual values, and end of the listing of values, for example, using respective delimiters.

An example value record 312 may include a value identifier 316, a name of the value 318, one or more parent value identifiers 320, and one or more child value identifiers 322. Each parent value identifier (e.g., 324) identifies a parent of the value 316. Each child value identifier (e.g., 326) identifies a child of the value 316. Thus, for each value, its parents (if any) and its child (if any) values can be identified facilitating several options for set comparisons during matching operations.

By configuring the data structure for specifying an attribute value to include parent attribute values and/or child attribute values, embodiments enable the definition of attribute value hierarchies. An attribute value may have none, one or more parents, and/or none, one or more child attribute values.

Attribute value hierarchies enable, in some embodiments, values to be specified at the optimal granularity for each order.

FIG. 3B illustrates an example optimization used in some example embodiments to obtain more efficient use of memory space, and for speed of processing. Each attribute value of an attribute may be assigned a respective integer, and all processing and/or matching of the attribute is based on the assigned integers. This mapping of each attribute value to a respective integer may be done without regard to the actual value of the attribute value, thus enabling a mapped set of attribute values that may be tailored to the specific context of the system. For example, in the example shown, the zip codes may be arranged according to some predetermined criteria and then the ordered zip codes mapped to respective integers in sequence. In this manner, for example, the zip codes may be mapped to an ordered sequence of integers in accordance with the respective populations, so that order comparison may be performed by specifying a range of integers for the most populous zip codes, in lieu of specifying each individual zip code.

FIG. 3C illustrates another example optimization where attribute values for an attribute are mapped to bitmaps. In the example shown, a date or range of dates attribute, is represented as a 32 bit bitmap, where each bit corresponds to a day in a particular month. Thus, the bitmap can efficiently represent multiple days within a month by turning on respective bits corresponding to each of those dates. Regardless of whether the multiple days are a sequence of days, randomly spread throughout the month, correspond to a pattern over the month (e.g., every Saturday etc.), a 32-bit bitmap can represent the date requirement. This provides for compact representation of the date information, and also for more efficient matching operation because the entire date range can be compared by a single comparison of a bitmap as an integer.

Figure 4A:
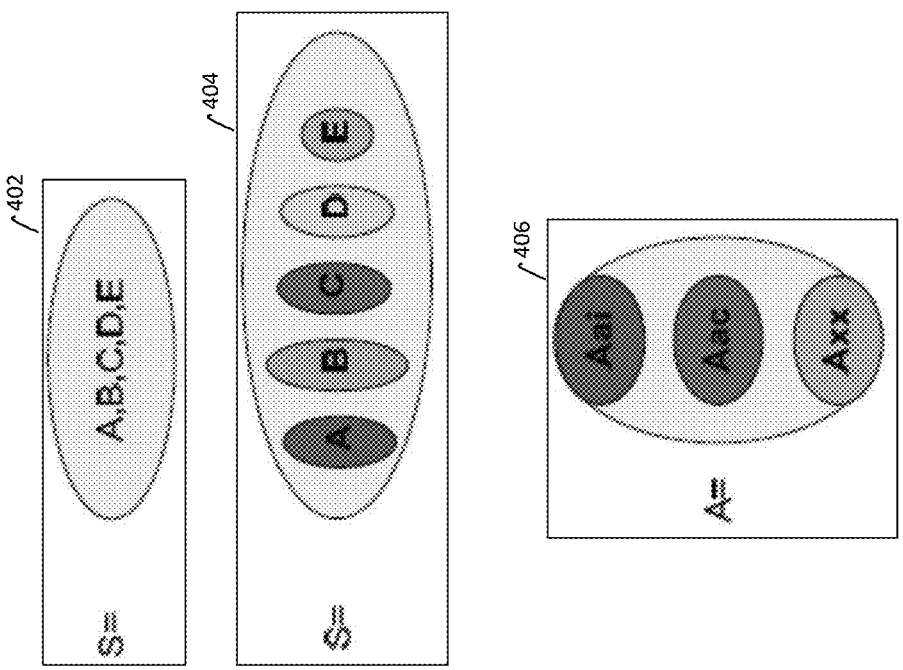
Figure 4B:
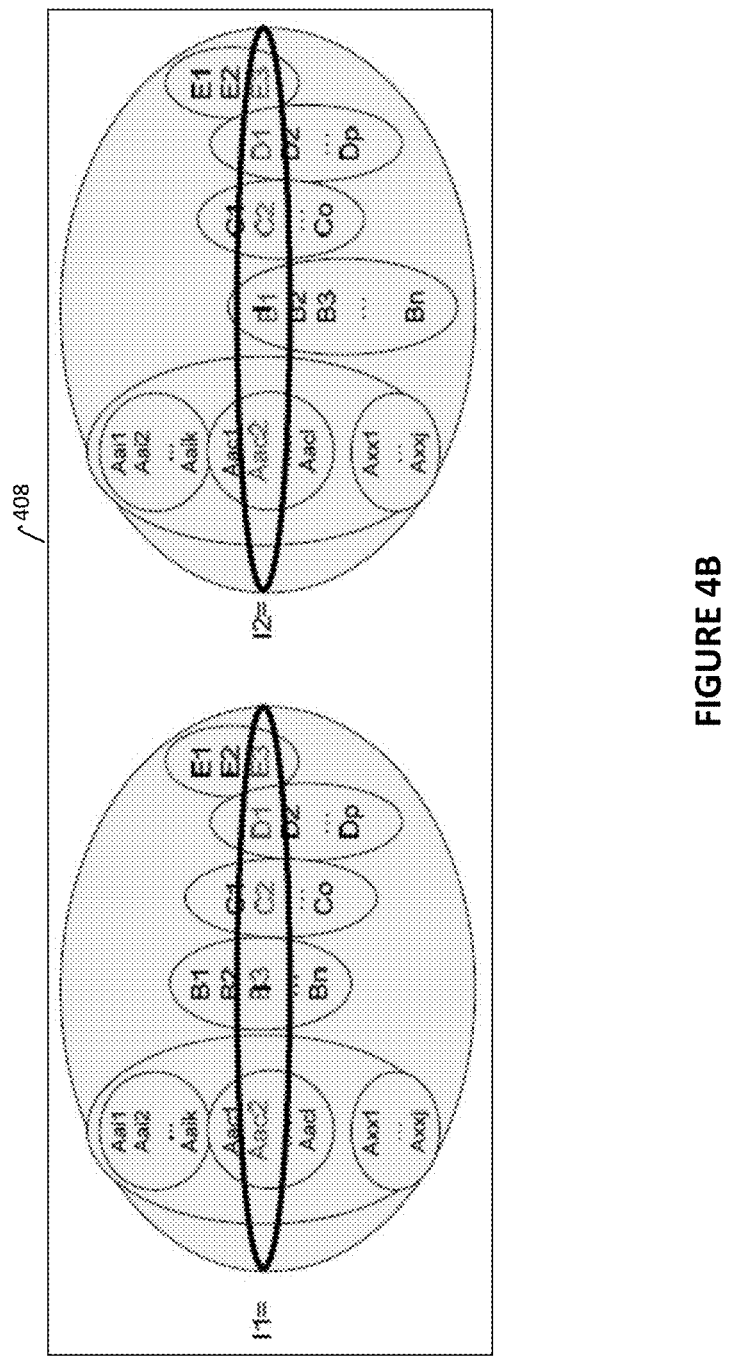

Description of FIG. 4 (FIGS. 4A-4B)

FIG. 4A-4B illustrate an example process of selecting attributes for tokenizing a tradable instrument, according to some example embodiments. A process such as that shown in FIGS. 4A-4B may be used for securitizing advertisement inventory. An instrument created in such a way could be used as a descriptor for alike inventory assuring tradable instrument durability over time and allowing continuous trading of variant inventory instruments, as well as aggregation and apportioning of instruments.

In the example illustrated in FIGS. 4A-4B, five attributes are available for potential use in an instrument description. A graphical user interface or the like may be used to present the available set 402 of attributes to the user. The attributes may be, for example, "A" representing travel, "B" representing geography, "C" representing demographics, "D" representing advertisement venue quality characteristic, and "E" representing space (ad) sizing.

The user may then select one or more of the attributes for including (e.g., in addition to unitary-valued attributes) in a particular instrument description. The selection may be performed by selecting the respective sets on a GUI. Display view 404 shows A, B, C, D and E having been selected for inclusion in the instrument description. Thus, the set of matching list attributes for the instrument may be S={A,B, C,D,E}. The ordering of the selected attributes may be irrelevant and may be determined only by business logic considerations.

One or more of attributes A-E may have more than one attribute value. For example, A (Travel) may have multiple values including "Air Travel" and "Travel Accommodations". Such attributes may be represented as a set of values.

Thus, the set S can be represented as a S={A1, A2, A3 . . . Ak, B1, B2 . . . Bl, C1 . . . Cm, D1 . . . Dn, E1 . . . Eo} or {{A},{B},{C},{D},{E}} or more accurately set S is a union of sets {A},{B},{C},{D} and {E} or {S}={A} U {B} U {C}U{D}U{E}. The system allows for respective attributes to have different number of elements.

Since some of the attribute values of set {A} and the like, may still have multiple values (e.g. Travel Accommodations could be Luxury Hotels, Spas or Motels), set {A} may itself be represented as having one or more subsets of values as elements. For example, 406 shows the set {A} having sets {Aai}, {Aac} and {Axx} as elements, A={Aai, Aac, Aax}. That is, A is a unit of sets {Aai}, {Aac} and {Axx.}

Then an instrument may be defined by selecting an element from each set A, B, C, D and E, where some of the selected elements may be attribute values of a descendent attribute of the highest level attributes A-E. For example, display 408 illustrates a selection of attributes for instrument I such that one attribute from each of the sets A-E is selected for I. A set of tradable Advertisement marketplace instruments I may be defined as a set of subsets each consisting of one and only one value of each attribute (a union of single values in each attribute): {I}={i1,i2,i3 . . . in}, where n is the number of attributes and Ii belongs to a set {C} or Ii C {C}.

To further illustrate the concept, each set of attributes may be expanded to reveal their values as shown in FIG. 4B. Set {I1}={Aac2,B3,C2,D1,E3} and I2 will be ({I2}={Aac2,B1, C2,D1,E3}).

In some embodiments, the above I1 and I2 may uniquely identify, not only a tradable instrument, but also a relative screen position in a GUI implementation of instrument filtering.

Figure 5A:
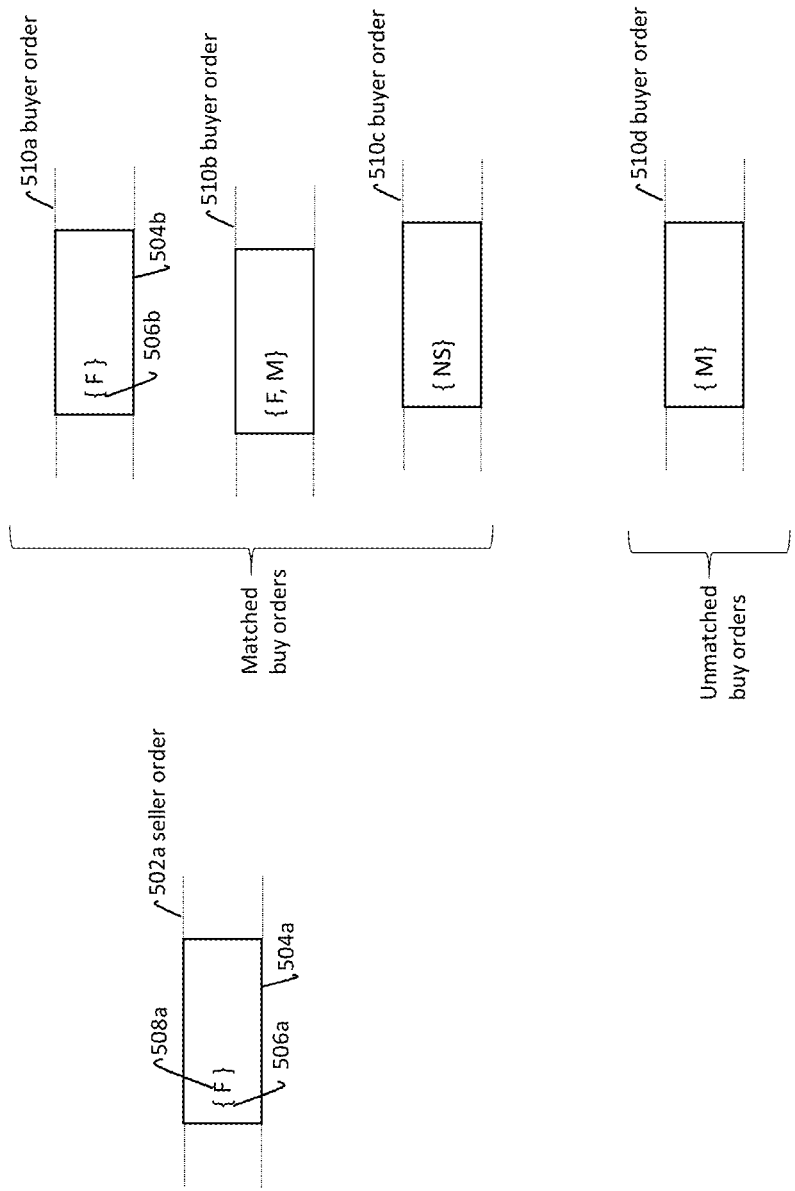
Figure 5B:
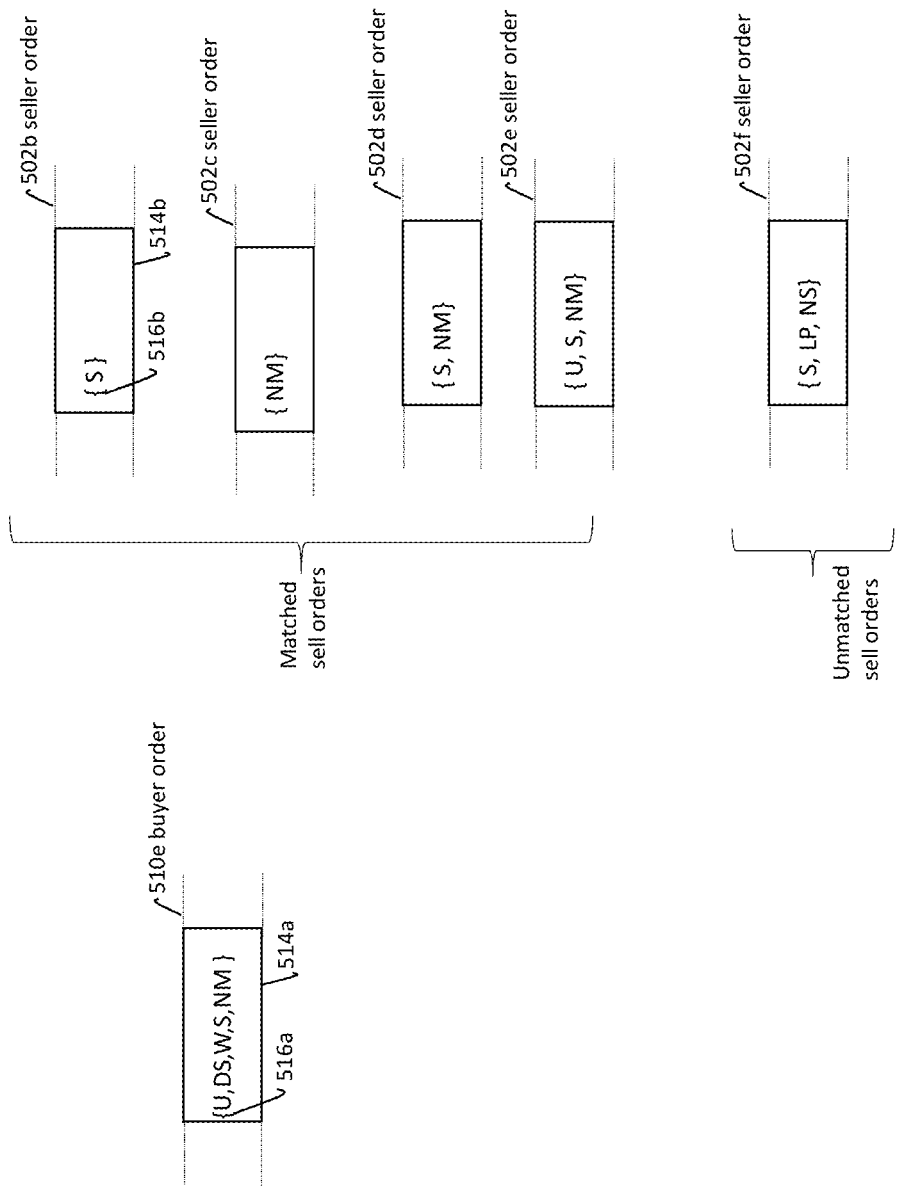
Figure 5C:
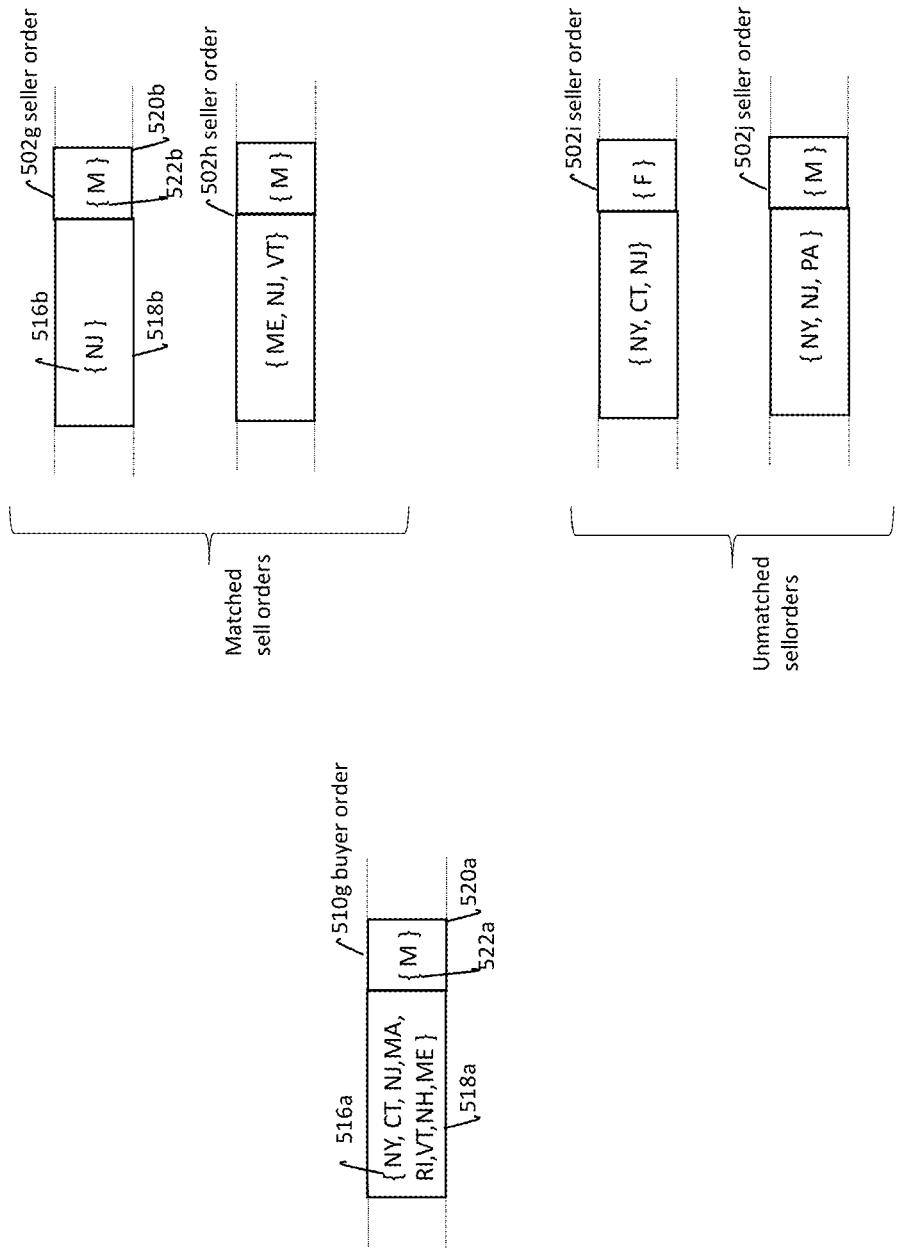

Description of FIG. 5 (FIGS. 5A-5E)

FIG. 5A-5E illustrate example set-valued attributes in records, and matching between attributes, according to some example embodiments.

FIG. 5A illustrates a comparing operation on a gender attribute, which is specified as a matching list field, of example records. In this example, the gender attribute is configured as a buyer controlled whitelist, meaning that the seller's gender attribute value set should be a subset (same or proper subset) of the buyer's whitelist of gender attribute values. According to an example, an advertiser may wish to target a campaign or campaign creative to a specific gender, or may have a campaign that is not gender dependent. A publisher may describe their inventory as targeted towards a single gender, or more than one. This creates a situation where a single publisher's sell order for 'Female' is eligible to match with buy orders which specify 'Female', 'Male, Female', and 'Not Specified'.

In the illustrated example, the seller order 502a includes a gender attribute 504a that has a set 506a of values. The seller order specifies just one value "F" 508a for the targeted gender. The seller order 502a is compared against buyer orders 510a-510d. Buyer orders 510a and 510b each includes "F" (e.g., order 510a has F as the only value in the set 506b of values for the gender attribute 504b, and order 510b has F as one of a plurality of values for the gender attribute) as a value in the gender attribute, and therefore matches the seller order 502a because the set {F} of seller order 502a is a subset of the gender attribute value sets {F} and {F, M} of the buyer orders 510a and 510b, respectively. Seller order 502a also matches buyer order 510c because order 510c specifies {NS (not specified)} as its buyer controlled whitelist of gender attribute values, and NS is deemed to include any single or combination of gender attribute values as a subset.

However, buyer order 510d does not match seller order 502a because the sellers gender value attribute set {F} is not a subset of the buyer's whitelist gender value attribute set {M}.

On the other hand, if 504a in seller order 502a is specified as a defined list (instead of a whitelist), then a match would require include the value 508a and thus 510c would not have matched.

As illustrated in FIG. 5A, when a buyer order includes a whitelist for a matching list attribute, a match can occur only if the seller's defined list of attribute values for the corresponding attribute is the same as, or a subset of, the values on the buyer's whitelist. These attributes work in conjunction with other matching list attributes, and non-matching list attributes, such as price and volume, to determine whether two orders match.

FIG. 5B illustrates another example of a buyer controller whitelist operation. FIG. 5B shows an example where a buyer (advertiser) wishes to target a campaign against one or more marital statuses, and a seller (publisher) has inventory which is visited by users of various statuses. For example, the buyer may create a buy order for ten million impressions, defining the specific target marital statuses: 'Un-Married, Divorced/Separated, Widowed, Single, Never Married' (order 510e having a marital status attribute 504a specifying a set 516a of values {U,DS,W,S,NM}). In this example, the buyer is comfortable with showing their campaign to users who are un-married, single, divorced/separated, single, or never married. However, the buyer does not want to show the campaign to people whose marital status is anything other than these values, such as, married.

The seller's sell orders with matching list values of only 'Single' (order 502b with marital status attribute 514b and set 516b of attribute values), only 'never Married' (order 502c), or a combination of the above values, such as, 'Single, Never Married' (order 502d)' or 'Un-Married, Single, Never Married' (order 502e) will match. The seller's sell orders with a partial match, such as 'Single, Living with Partner, Un-Married' (order 502f), will not match, as "Living with Partner" is not on the buyer's white list.

As such, if a seller creates a sell order for 2 million impressions with targeting for 'Single, Never married', it will match with the buyer, and leave the buyer with an open buy order for 8 million impressions. If a second sell order for 5 million impressions with targeting for 'Un-Married', it will match, leaving the buyer with an open buy order or 3 million.

Matching list attributes may also be combined, such that a user can specify multiple values for multiple attributes, with each attribute acting with its own independent matching requirements.

FIG. 5C illustrates an example of combining a geography attribute and a gender attribute. A buyer may wish to target a campaign to certain states within the United States, or may wish to target users in all of the United States. For example, a buyer may submit a buy order 510g for 10 million impressions targeting all of the north east by specifying the geography matching list attribute 518a to have a set 516a of values 'New York, Connecticut, New Jersey, Massachusetts, Rhode Island, Vermont, New Hampshire, Maine'. In addition, the buyer may wish to target only 'Males' in these states by specifying a gender attribute 520a to have a set 522a of 'Males' as the only value.

If a seller submits an order 502i for 2 million impressions targeting 'New York, Connecticut, New Jersey', and 'Females', the orders will not match. While the geographic targeting on its own matches, the combination of geographic targeting and gender targeting do not match. Similarly, if a seller submits an order 502j for 2 million targeting 'New York, Connecticut, Pennsylvania', and 'Males', the orders will not match. While gender targeting matches in this example, and there is overlap in geo targeting for New York and Connecticut, Pennsylvania is outside of the buyer's whitelist (and thus, the sellers geographic attribute value set if not a subset of the buyer controlled whitelist).

If a seller submits an order 502g for 2 million impressions targeting 'New Jersey' as the attribute value set 516b for the geographic attribute 518b, and 'Males' as the attribute value set 522b for the geographic attribute 520b, this sell order will match, leaving the buyer with a buy order of 8 million impressions. If another seller submits an order 502h for 4 million impressions targeting 'Maine, New Hampshire, Vermont' and 'Males', it will match leaving the buyer with a remaining order for 4 million.

FIGS. 5D and 5E illustrate examples of controlled whitelist operations. As described above, each attribute may have a defined list and a whitelist (or blacklist), and each attribute may have a different identifier for who controls the whitelist—buyer or seller. While some attributes may have the whitelist identified by the buyer, others may have the whitelist identified by the seller, and these attributes, can occur in orders together.

FIG. 5D illustrates an operation with a creative attribute specifying a buyer controlled whitelist, and an education attribute specifying a seller controlled whitelist. A buyer may wish to target individuals with only a high school degree for a campaign with a creative that expands when a user rolls over the image with their cursor. The buyer order 510$h$ specifies 'high school degree' in the set 528$b$ of values of the education attribute 524$b$, and the same order may have a creative attribute 526$b$ which specifies 'expandable user-initiated rollover' as the set 530$b$ of values. The education requirement is controlled by the advertiser's (buyer) whitelist, while acceptance of the creative attribute of the campaign is controlled by the seller's whitelist.

For example a seller may have a sell order 502$k$ for inventory which identifies only users with targeting 'high school degree' in the set 528$a$ of values of the education attribute 524$a$, and the same order may have a creative attribute 526$a$ targeting 'standard banner, expandable (user initiated—click), expandable (user initiated—rollover)' in the set 530$a$ of attribute values. In this case, since education targeting matches the buy order whitelist 528$b$, and the buy order's creative attribute of 'expandable (user initiated—rollover)' matches the sell order whitelist 530$a$, these two orders match.

FIG. 5E illustrates a matching operation for orders having a complex set of values for the same attributes. For example, a buyer places a buy order 510$i$ targeting users with education attribute specifying 'highschool, some undergraduate' as the set of attribute values, for a campaign with creative attribute targeting of 'audio ad (auto play), survey' specified as values for a creative attribute.

A first seller order 502$l$ includes an education attribute having 'highschool, some undergraduate, undergraduate degree' as attribute values, and a creative attribute having 'standard banner, audio ad (auto play), audio ad (user initiated)' as attribute values.

A second seller order 502$m$ includes an educational attribute having value set 'highschool, some undergraduate', and creative attribute value set 'standard banner, survey'.

A third seller may place a sell order 502$n$ with the educational attribute value set 'some undergraduate, undergraduate degree', and creative attribute value set 'standard banner, audio ad (auto play), audio ad (user initiated), survey'.

A fourth seller places a sell order 502$o$ with educational attribute value set 'highschool, some undergraduate', and a creative attribute having the value set 'standard banner, audio ad, (auto play), audio ad (user initiated), survey'.

In the example embodiment, the first seller's order 502$l$ does not match because the addition of 'undergraduate degree' for educational targeting is not acceptable for the buyer's white list, while the lack of 'survey' for the seller's creative attribute whitelist, also would block this order from matching.

The second seller order 502$m$ does not match because the educational targeting does not match the buyer's white list, even though the creative attribute targeting is acceptable.

The third seller order 502$n$ does not match because while the educational targeting matches the buyer's whitelist, the creative attributes of the buyer's campaign do not match the seller's whitelist.

The fourth seller order 502$o$ does match because the education attribute value set matches for the buyer's whitelist, and the creative attribute value set matches for the seller's whitelist.

Comparisons between orders, can be based matching rules in a rules database, such as, for example, rules database 126 shown in FIG. 1.

Unitary attributes may be matched in binary fashion, i.e. if attribute of aggressor order equal to the same attribute of a standing one, matching continues, otherwise a pair match is considered a failure, and the aggressor order matching continues with next standing order (if any).

Array (set) attributes matching is different from the unitary item matching. When checking that two orders may match, attributes criteria is considered using the following attributes matching rules.

The following rules may be examples of some rules applied for blacklists and defined lists, in some example embodiments. An example rule may specify that, for a blacklist matching a defined list, the two lists should not intersect. Example rules may specify a priority between different types of lists (e.g., priority of whitelist versus defined list). For example, another rule specifies that when a whitelist matches a defined list, the defined list should be a subset of the whitelist.

The following are some example matched/unmatched operations according to the above rules, where a generic list type identifier, an integer, type of list, black, defined or white list, and list of attributes is represented by integers: Seller's definedlist versus Buyer's blacklist examples (Seller's definedlist ABCD <matches> Buyer's blacklist XYZ; Seller's definedlist ABCD <does not match> Buyer's blacklist ABCD; Seller's definedlist ABCDXYZ <does not match> Buyer's blacklist ABCD; Seller's definedlist ABCD <does not match> Buyer's blacklist ABCDXYZ; Seller's definedlist ABCD <does not match> Buyer's black CDXYZ), Seller's black versus Buyer's defined examples (Seller's black ABCD <matches> Buyer's definedlist XYZ; Sellers blacklist ABCD <does not match> Buyer's definedlist ABCD; Seller's black ABCD <does not match> Buyer's definedlist ABCDXYZ; Seller's black ABCDXYZ <does not match> BUY definedlist ABCD; Seller's black ABCD <does not match> Buyer's defined CDXYZ), Seller's defined versus Buyer's white examples (Seller's definedlist ABCD <matches> Buyer's white ABCDXYZ; Seller's definedlist ABCD <matches> Buyer's white ABCD; Seller's defined ABCDXYZ <does not match> Buyer's white ABCD; Seller's defined ABCD <does not match> Buyer's white XYZ; Seller's defined ABCD <does not match> Buyer's white CDXYZ), Seller's defined versus Buyer's white examples (Seller's white ABCDXYZ <matches> Buyer's defined ABCD; Seller's white ABCD <matches> Buyer's defined ABCD; Seller's white ABCD <does not match> Buyer's defined ABCDXYZ; Seller's whitelist ABCD <does not match> Buyer's definedlist XYZ; Seller's whitelist ABCD <does not match> Buyer's definedlist CDXYZ).

Description of FIG. 6

FIG. 6 illustrates an example process 600 of operations for creating an order, in accordance with some example embodiments. Process 600 may be used, for example, for a user on client systems 104 or 106 to create and/or submit an order to the server infrastructure 102.

At operation 622, a user may submit to an order server 602 (e.g., such as the order creation server 112) an order form 620 to create an order. For example, a user of a client system such as either of client systems 104 and 106, may submit an order to buy or sell advertising inventory on the electronic trading servers 102.

The order server 602 may include an order controller 604 and an order service 606. The order controller 604, may receive the order form 620 and check permissions 624 of the submitting user. If the user is not permitted to create orders, the user may be notified and the process may end.

If the order form is submitted with appropriate permissions, then at operation 626, the order controller 604 calls the order service 606 to create the order in accordance with the submitted order form. In some embodiments, the creation of the order may include the order server providing an interface to the user, by which the user may edit the order form in an interactive process. The interactive process may include the order server providing the user with one or more templates and/or default attribute values for creating an order, such as an order for a particular type of advertisement. The order server may obtain the templates etc. by accessing a database, such as, for example, instruments and attributes database 121 that has system defined instruments, attributes and corresponding values. In some embodiments, some users may be authorized to, in the process of, or before creating an order, to define and/or save an already defined instrument and/or instrument family, for example, with the collaboration of variant inventory defining server 120 and instruments and attributes database 121.

The order service 606, in operation 628, may request the position information in relation to the order from the position server 608. For example, if the order is a sell order, the order server may request position information to verify that the user is in possession of the instrument and the quantity of the instrument for which the order is being submitted. The position information may also be used to verify that a quantity in a buy order is consistent with an amount of that instrument available to be traded.

The position server 608 (e.g., position management server 116), in operation 630, retrieves the requested positions from a position repository 612 (e.g., positions database 130). At operation 632, the requested position information is sent to the position service 608.

At operation 634, the position information is returned to the order service 606. The operations 626-632 may be repeated until the order form is completed.

At operation 636, depending on the configuration, the order is either saved to the order repository 610, saved into a temporary memory, or submitted for trading. If the order is saved, a confirmation of the saved order is returned to the order server 606 at operation 638. If the order is submitted for trading, the order may be traded in a process such as that described in relation to FIGS. 7-8, and a confirmation for the trade issued at operation 638.

At operation 640, the order confirmation is returned to the order controller. At operation 642, a response is created by the order controller 604, and at operation 644, the order response 646 is returned to the user.

Description of FIG. 7

FIG. 7 illustrates an example sequence of operations 700 for submitting an order to a trading system such as server infrastructure 102, according to some example embodiments. The sequence 700 represents a buyer order being submitted to a trading system, and corresponding example interactions between buyer's client system 702, seller client system 704, order routing system 706, matching engine 708, order book server 710, trade management server 712, position management server 714, and fulfillment management server 716.

Continuous electronic two-sided trading is a process in which all incoming buy and sell orders are matched continuously in near real time against active orders in order books (one per listed instrument) according to matching rules and contract stipulations submitted by each party.

An order, as used herein, is a firm request to buy or sell a specified quantity of variant inventory. An order may include: instrument ID, limit price or floor (except market orders), desired (maximum) quantity, duration and contingency classifications (see below), and appendage for additional requirements.

A variant inventory instrument, as used in example embodiments, may include: instrument (securitized variant inventory descriptor) and a time factor. The time factor may include delivery specification (e.g., week, day, month etc.), duration (e.g., YYMMDD).

The process begins with a buyer's client system 702 transmitting, at operation 720, an order to the trading system. The order may have been generated by a process such as that described in relation to FIG. 6, and may be an order to buy a specified number of advertisements with the specified parameters. The parameters of the order are defined in accordance with system defined attributes and attribute values, such as, for example, that defined in the instruments and attributes database. The order may be of an instrument type and instrument family that is defined in the system.

The order routing server 706 (e.g., order creation server 112) of the trading system may receive the buy order.

The order routing server 706 determines that the received communication is an incoming order for immediate trading, and, at operation 722, submits the order to the matching engine 708. If the order is determined not to be for immediate trading, then it may be added to the order book database without setting the record to an active state (e.g., an attribute defined for each order in the order book to identify whether that record is at present available for trading).

The order routing server may identify the appropriate order book based on the instrument family, and route the order so that it is traded against the appropriate order book.

At operation 724, the matching engine 708 and order book server 710 perform continuous trading to find one or more sell orders that match the aggressor buy order. An example matching process is described in relation to FIG. 8 below. If a match is found, then a trade has been identified. If no matching is found, then, depending on the type of order, the aggressor buy order may be added to the order book database for subsequent trading.

At operation 726, the matching engine 708 communicates information about the matched orders to the trade management server 712. The trade management server may operate to keep track of the trades that were successfully matched by the matching engine. For example, if the quantity of the instrument of the aggressor buy order was completely matched between three sell orders, then the aggressor order and the three matched sell orders (or their information, in another form) may be stored in a memory at least until delivery associated with the trade has been completed.

The trading management server 712 communicates the trade information, in operation 728, to position management server 714. The position management server 728 operates to adjust the positions of the various instruments as the trading occurs. The position information may be used by various other parts of the systems too to verify that amounts specified in an order of an instrument is actually available to be ordered.

The position management server 714 may then communicate the position updates to the seller's client system 704 in operation 730, and to the buyer's client system 702 in operation 732. The information can be used by these client systems to create records, and the like.

At operation 734, the position management system 714 communicates the trade information and position updates to the fulfillment management server 716. The fulfillment management server may update the buyer client system regarding fulfillment requirements at operation 735.

The seller's client system 704 communicates delivery information and tracking information to the fulfillment management server 716.

The fulfillment management server 716 communicates, in operation 742, information about the delivery and tracking to the buyer's client system 702.

The buyer's client system 702 makes payment, at operation 744, to the fulfillment management server 716. The fulfillment management server 716 then communicates the payment and/or payment information to the seller's client system 704.

Description of FIG. 8

FIG. 8 illustrates a flowchart of an example matching process 800, according to some example embodiments. The matching process 800 may be performed, for example, during operation 724 of the continuous trading process 700.

The extended matching process used in example embodiments is a process in which new orders (aggressor orders) are matched to standing orders in an order book, in order of established priority with regards to certain appendage stipulations to the orders.

General matching rules include enforcing the matching priority of price, and then time. Although price/time priority is the most common, variant asset marketplace may use alternative and/or additional priorities, such time/price or inventory or member characteristic based ones.

In example embodiments, the trade price may depend on order type and matching rules such as those described above. The trade quantity may be determined by an aggressor order minimal and full quantity specified, as well as other criteria such as its contingency specification. An aggressor order may continue being matched with standing orders until it is being filled, partially filled or withdrawn based on above criteria.

The appendages to orders are used to allow trade participants communicate their business requirements as collection of attributes attached to the orders that are considered during matching, assuring that a trade reflects an intersection of their requirements acceptable to both sides.

Example embodiments allow multiple lists to be specified for each order. These lists may contain: an integer generic list type identifier, a generic list data type identifier (e.g., integer or bitmap), type of list (e.g., black, defined or white list).

The matching engine may be agnostic to actual business attributes values, as user interface is responsible for the mapping inbound and outbound streams allowing a significant data streaming and processing overhead reduction.

At operation 802, a new order (an aggressor order) $O_N$ is received.

At operation 804, a counter i is initialized to 0.

At operation 806, the comparison process is begun by checking whether there are more orders $O_i$ in the order book database to be compared against. Where n is the number of orders in the order book database, the check i<n, determines whether or not the process has reached the last order in the order book. The orders in the order book database may be referred to as standing orders.

If i is less than n, then it is determined that more standing orders exist, and process 800 proceeds to operation 808, Otherwise, process 800 proceeds to operation 812.

Operation 812 is reached when the aggressor order has already been unsuccessfully compared to all standing orders, without identifying a trade. Therefore, at operation 812, the aggressor order is added to the order book database, and the process 800 for matching that aggressor order ends.

Operation 808, when reached, obtains the next standing order $O_i$ from the order book database. $O_i$ will be of the same instrument type as the aggressor order. For example, two orders are deemed to have the same instrument type if their instrument family level attributes and the instrument level attributes are identical. In some embodiments, orders may be considered to be of the same instrument type if a predetermined subset of the instrument family level attributes and instrument level attributes are identical. The order book database may maintain respective databases and/or tables for each instrument type.

At operation 810, the aggressor order and the retrieved standing order are compared with respect to at least some of the order attributes. If a match is determined with respect to the subset of attributes, the aggressor order and the retrieved standing order are deemed to be in a tentative match. In some example embodiments, the orders are compared with respect to one or more unitary-valued attributes. For example, an aggressor order may be deemed to tentatively match $O_i$ if the $O_i$ price is less than or equal to the aggressor order's price, or to not match otherwise.

If a tentative match is determined, process 800 proceeds to operation 814. At operation 814, one or more set-valued attributes are compared between $O_N$ and The comparing of a set-valued attribute between $O_N$ and $O_i$ may be determined to be a match, if the two sets are identical. A match may also be determined based upon non-zero intersects between the two sets.

If any of the set-valued attributes are indicated to include a whitelist or blacklist, then the match determination is also based upon processing whitelist/blacklist rules such as those described above.

The comparing may be performed for each of a plurality of set-valued attributes.

If, based on the comparing of the one or more set-valued attributes, it is determined that $O_N$ and $O_i$ do not match, then processing proceeds to operation 818.

Operation 818 may also be reached if there was no tentative match at operation 810. Operation 818 increments i to start considering the next standing order (if any), and passes control of the process 800 to operation 806.

If, on the other hand, it was determined at operation 814, that the set-valued attributes are a match, then $O_N$ and $O_i$ may deemed to be a match and a trade is identified. A trade as used here may be considered the forming of a transaction, for example, such as forming of a futures or forwards contract.

The next operation, operation 816, compares the volumes and handles the trade accordingly.

If $O_i$ volume is less than that of $O_N$, then at operation 820 it sis determined that $O_i$ is fully matched, and at operation 822, $O_i$ may be removed, or marked to be removed, from the order book database.

At operation 824, the volume of $O_i$ is subtracted from the volume of $O_N$.

At operation 826, the trade records are updated to note that a first trade has been identified where $O_N$ is partially matched (i.e., the volume requirement of $O_N$ is partially met) with $O_i$.

After operation 826, $O_N$, now with the updated volume, may continue to be compared to the remaining standing orders by passing control of process 800 to operation 818.

If at operation 816, it is determined that $O_N$ and $O_i$ volumes are identical, then at operation 828 is determined that $O_N$ and $O_i$ both have been fully matched.

At operation 830, $O_i$ is removed, or is marked to be removed, from the order book database, and at operation 832, trade data is updated to represent the trade involving the full match of $O_N$ and $O_i$.

After operation 832, the matching process for $O_N$ may be complete.

If at operation 816, it is determined that $O_i$ volume is greater than that of $O_N$, then at operation 834 it is determined that $O_N$ is fully matched and $O_i$ is partially matched.

At operation 836, $O_i$ is updated to represent the new volume after subtracting the volume matched with $O_N$.

At operation 838, the trade information is updated to note that $O_N$ has been fully matched with $O_i$. The matching process for $O_N$ completes after operation 838.

Description of FIG. 9

FIG. 9 is a block diagram of an example computing device 900 (which may also be referred to, for example, as a "computing device," "computer system," or "computing system") according to some embodiments. In some embodiments, the computing device 900 includes one or more of the following: one or more processors 902; one or more memory devices 904; one or more network interface devices 906; one or more display interfaces 908; and one or more user input adapters 910. Additionally, in some embodiments, the computing device 900 is connected to or includes a display device 912. As will explained below, these elements (e.g., the processors 902, memory devices 904, network interface devices 906, display interfaces 908, user input adapters 910, display device 912) are hardware devices (for example, electronic circuits or combinations of circuits) that are configured to perform various different functions for the computing device 900.

In some embodiments, each or any of the processors 902 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 902 uses an instruction set architecture such as x86 or Advanced RISC Machine (ARM).

In some embodiments, each or any of the memory devices 904 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 902). Memory devices 904 are examples of non-volatile computer-readable storage media.

In some embodiments, each or any of the network interface devices 906 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 908 is or includes one or more circuits that receive data from the processors 902, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 912, which displays the image data. Alternatively or additionally, in some embodiments, each or any of the display interfaces 908 is or includes, for example, a video card, video adapter, or graphics processing unit (GPU).

In some embodiments, each or any of the user input adapters 910 is or includes one or more circuits that receive and process user input data from one or more user input devices (not shown in FIG. 9) that are included in, attached to, or otherwise in communication with the computing device 900, and that output data based on the received input data to the processors 902. Alternatively or additionally, in some embodiments each or any of the user input adapters 910 is or includes, for example, a PS/2 interface, a USB interface, a touchscreen controller, or the like; and/or the user input adapters 910 facilitates input from user input devices (not shown in FIG. 9) such as, for example, a keyboard, mouse, trackpad, touchscreen, etc. . . .

In some embodiments, the display device 912 may be a Liquid Crystal Display (LCD) display, Light Emitting Diode (LED) display, or other type of display device. In embodiments where the display device 912 is a component of the computing device 900 (e.g., the computing device and the display device are included in a unified housing), the display device 912 may be a touchscreen display or non-touchscreen display. In embodiments where the display device 912 is connected to the computing device 900 (e.g., is external to the computing device 900 and communicates with the computing device 900 via a wire and/or via wireless communication technology), the display device 912 is, for example, an external monitor, projector, television, display screen, etc. . . .

In various embodiments, the computing device 900 includes one, or two, or three, four, or more of each or any of the above-mentioned elements (e.g., the processors 902, memory devices 904, network interface devices 906, display interfaces 908, and user input adapters 910). Alternatively or additionally, in some embodiments, the computing device 900 includes one or more of: a processing system that includes the processors 902; a memory or storage system that includes the memory devices 904; and a network interface system that includes the network interface devices 906.

The computing device 900 may be arranged, in various embodiments, in many different ways. As just one example, the computing device 900 may be arranged such that the processors 902 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 900 may be arranged such that: the processors 902 include two, three, four, five, or more multi-core processors; the network interface devices 906 include a first network interface device that implements Ethernet and a second network interface device that implements WiFi and/or Bluetooth; and the memory devices 904 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the server infrastructure 102, client systems 104 and 106, matching engine 110, order book server 108, trade management server 114, position management server 116, fulfillment management server 118, standing orders database 124, matching rules database 126, trades database 128, positions database 130, delivery records database 132, instruments and attributes database 121, order creation server 112, and inventory defining server 120, each of which will be referred to individually for clarity as a "component" for the remainder of this paragraph, are implemented using an example of the computing device 900 of FIG. 9. In such embodiments, the following applies for each component: (a) the elements of the 900 computing device 900 shown in FIG. 9 (i.e., the one or more processors 902, one or more memory devices 904, one or more network interface devices 906, one or more display interfaces 908, and one or more user input adapters 910), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 904 (e.g., in various embodiments, in a volatile memory device such as a RAM or an instruction register and/or in a non-volatile memory device such as a flash memory or hard disk) and all actions described herein as performed by the software modules are performed by the processors 902 in conjunction with, as appropriate, the other elements in and/or connected to the computing device 900 (i.e., the network interface devices 906, display interfaces 908, user input adapters 910, and/or display device 912); (c) alternatively or additionally, to the extent it is described herein that the component processes and/or otherwise handles data, in some embodiments, such data is stored in the memory devices 904 (e.g., in some embodiments, in a volatile memory device such as a RAM and/or in a non-volatile memory device such as a flash memory or hard disk) and/or is processed/handled by the processors 902 in conjunction, as appropriate, the other elements in and/or connected to the computing device 900 (i.e., the network interface devices 906, display interfaces 908, user input adapters 910, and/or display device 912); (d) alternatively or additionally, in some embodiments, the memory devices 902 store instructions that, when executed by the processors 902, cause the processors 902 to perform, in conjunction with, as appropriate, the other elements in and/or connected to the computing device 900 (i.e., the memory devices 904, network interface devices 906, display interfaces 908, user input adapters 910, and/or display device 912), each or any combination of actions described herein as performed by the component and/or by any software modules described herein as included within the component.

The hardware configurations shown in FIG. 9 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 9, (e) via other hardware arrangements, architectures, and configurations, and/or via combinations of the technology described in (a) through (e).

Technical Advantages of Described Subject Matter

Certain example embodiments provide improved systems and processes for representing heterogeneous inventories having large numbers of descriptive attributes, and for comparing records of such inventories to determine matches between such records. Some example embodiments enable representing certain inventories with records having multiple types of attributes, such as, for example, unitary attributes and set attributes. The proposed representation structures and matching techniques enable efficient matching between records based both on perfect matches between unitary-valued attributes and less than perfect matches between set-valued attributes. Certain optimization included in the proposed comparing and matching techniques enables efficient real-time, or substantially real-time comparing and matching, of incoming inventory records with stored dynamically-changing set of records.

Example embodiments employ encoding techniques by which the digital storage space required for storing inventory records may be substantially reduced. Proposed data representations and matching techniques also result in improved speeds of computers configured to process inventory records.

In some embodiments the proposed techniques are employed in electronic trading of heterogeneous, variant inventories. Unlike conventional electronic trading platforms that are limited to trading inventories based on a small number of unitary-valued attributes, the proposed techniques enable comparing and matching inventories based on larger numbers of attributes. The proposed data representations and matching techniques, enable a large number of inventories that were not capable of being traded on conventional trading systems.

The technical features described herein may thus improve the usefulness of electronic trading systems by incorporating the capability to include heterogeneous and highly variant inventories thereby increasing the group of inventory types that can be traded in the system.

Additional Applications of Described Subject Matter

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), ATP, Bluetooth, and TCP/IP, TDMA, CDMA, 3G, etc.; and/or (iv) encrypted to ensure privacy or prevent fraud in any of a variety of ways well known in the art.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

While the technology has been described in connection with what is presently considered to be the most practical and preferred embodiment, it is to be understood that the technology is not to be limited to the disclosed embodiment, but on the contrary, is intended to cover various modifications and equivalent arrangements.

The invention claimed is:

1. An electronic trading system, comprising:
at least one memory having a monitored database of a dynamically changing set of stored electronic trading orders for a tradable instrument corresponding to a variant inventory, each electronic trading order being in the form of a record having a plurality of attributes including a first set of unitary-valued attributes and a second set of set-valued attributes, wherein each unitary-valued attribute in the first set has exactly one data item specified in the record as its value, and at least one of the set-valued attributes of the second set has more than one data item specified in the record as its value;
a hardware-based network interface configured to receive, from one or more external computing devices, incoming electronic trading orders for the tradable instrument; and
a processing system, including at least one hardware-based processor, configured to:
execute operations of a matching engine, wherein the matching engine is configured to perform continuous matching, and wherein the operations of the matching engine include identifying a transaction for a first incoming electronic trading order from the incoming electronic trading orders for the variant inventory, wherein the operations include:
comparing a first record corresponding to the first incoming electronic trading order to a plurality of second records each corresponding to one of the stored electronic trading orders in the monitored database in real-time, wherein the comparing the first record to a second record from the plurality of second records includes:
comparing the first set of unitary-valued attributes from the first record to the second set of unitary-valued attributes from the second record; and
only if said comparing the first set of unitary-valued attributes from the first record to the second set of unitary-valued attributes from the second record results in a successful match for unitary-valued attributes in the first record, comparing the second set of set-valued attributes from the first record to the second set of set-valued attributes of the second record, wherein at least one of the set-valued attributes in each of the first record and the second record specify a delivery requirement or a delivery commitment for the variant inventory;
wherein the transaction is identified when:
for each of one or more second records from the plurality of second records, said comparing the first record to the second record includes determining a successful match of the first record to the second record where:

(A) the exactly one data item specified as the value of a particular unitary-valued attribute in the first set of unitary-valued attributes of the first record is identical to the exactly one data item specified as the value of a corresponding unitary-valued attribute in the first set of unitary-valued attributes of the second record; and (B) at least one data item in the set of multiple data items specified as the value of a particular set-valued attribute of the first record is identical to a data item in the set of multiple data items specified as the value of the corresponding set-valued attribute in the second set of set-valued attributes of the second record; and a volume requirement specified in the first record is satisfied by an aggregate of volume commitments specified in the one or more second records providing a successful and complete match between the first record and the one or more second records;

update the monitored database in accordance with the identified transaction;

transmit, from the matching engine to at least one server, information corresponding to the identified transaction; and execute operations of the at least one server to:
keep track of successfully matched orders of the identified transaction transmitted by the matching engine; and
store, upon said successful and complete match, said information associated with the identified transaction at least until delivery corresponding to the identified transaction has been completed according to the delivery requirement specified in the first record.

2. The electronic trading system according to claim 1, wherein the comparing the first record to the second record results in the transaction for the first incoming electronic trading order being identified if the comparing the first record to the second record includes further determining that the set of multiple data items specified as the value of the particular set-valued attribute in the second set of set-valued attributes of the second record is not identical to the set of multiple data items specified as the value of a corresponding set-valued attribute in the second set of set-valued attributes of the second record.

3. The electronic trading system according to claim 1, wherein the comparing the first record to the second record results in the transaction for the first incoming electronic trading order being identified if the comparing the first record to the second record includes further determining that, for each attribute in corresponding second sets of set-valued attributes, a non-zero intersection between said first record and the second record.

4. The electronic trading system according to claim 3, wherein the comparing the first record to the second record results in the transaction for the first incoming electronic trading order being identified if the comparing the first record to the second record further includes, when another particular attribute is designated in the first record as a whitelist, determining that all data items specified as a value of the particular attribute in the second record is a subset of data items specified as a value of the particular attribute in the first record.

5. The electronic trading system according to claim 3, wherein the comparing the first record to the second record results in the transaction for the first incoming electronic trading order being identified if the comparing the first record to the second record further includes, when another particular attribute is designated in the first record as a blacklist, determining that no data items specified as a value of the particular attribute in the first record matches any data item of the particular attribute in the second record.

6. The electronic trading system according to claim 3, wherein the comparing the first record to the second record results in the transaction for the first incoming electronic trading order being identified if the comparing the first record to the second record further includes, when another particular attribute is designated in the first record as a defined list, determining that all data items specified as a value of the particular attribute in the first record matches data items specified as a value of the particular attribute in the second record.

7. The electronic trading system according to claim 1, wherein the comparing the first record to the second record further comprises performing said comparing the second set of set-valued attributes of the first record to the second set of set-valued attributes of the second record only if said comparing the first set of unitary-valued attributes from the first record to the second set of unitary-valued attributes from the second record results in a successful match for all unitary-valued attributes in the first record.

8. The electronic trading system according to claim 1, wherein one or more attributes of the second set of set-valued attributes represent delivery aspects of a tradable instrument.

9. The electronic trading system according to claim 8, wherein the tradable instrument represents an advertising in one or more delivery medium, and wherein the delivery aspects specified in the incoming electronic trading order include a plurality of values for a delivery dates requirement, gender requirements, marital status requirements, education level requirements, or geography requirements, of a target audience for the advertising.

10. The electronic trading system according to claim 9, wherein the delivery aspects specified in the incoming electronic trading order include a plurality of data items specified as a value for a delivery dates requirement specified in a bitmap.

11. The electronic trading system according to claim 9, wherein the delivery aspects specified in the incoming electronic trading order include a geographic attribute for which values are specified at a first level of a multi-level hierarchy, and wherein the delivery aspects specified in the stored electronic trading order include the geographic attribute for which values are specified at a second level of the multi-level hierarchy.

12. The electronic trading system according to claim 8, wherein the tradable instrument represents an advertising in one or more delivery medium, and wherein the delivery aspects specified in the incoming electronic trading order include a plurality of data items specified as a value for an attribute representing ad size requirements, ad publisher sites, display creatives, pacing of advertisements, or brands associated with the advertising.

13. The electronic trading system according to claim 7, wherein the second set of set-valued attributes of the stored electronic trading order is stored separately from the first set of unitary-valued attributes of the stored electronic trading order in the at least one memory and/or the monitored database, and is retrieved if said comparing the first set of unitary-valued attributes from the first record to the second set of unitary-valued attributes from the second record results is a successful match and is not retrieved if said comparing the first set of unitary-valued attributes from the first record to the second set of unitary-valued attributes from the second record results is not a successful match.

14. The electronic trading system according to claim 1, wherein the monitored database includes stored electronic trading orders for a second tradable instrument, and wherein the first set of unitary-valued attributes of the second tradable instrument is different in a number of attributes and/or a type of attributes, from the first set of unitary-valued attributes of the first tradable instrument.

15. The electronic trading system according to claim 14, wherein the second set of set-valued attributes of the second tradable instrument is different in a number of attributes and/or a type of attributes, from the second set of set-valued attributes of the first tradable instrument.

16. The electronic trading system according to claim 1, wherein the first set of unitary-valued attributes include a first subset of instrument family level attributes that are common to two or more tradable instruments in the electronic trading system, and a second subset of instrument level attributes, wherein a combined first subset and the second subset form a unique instrument descriptor in the electronic trading system.

17. The electronic trading system according to claim 1, wherein said comparing the first record to the second record is performed in accordance with matching rules, wherein the matching rules include one or more rules specifying that an incoming electronic trading order is matched in accordance with a type of the tradable instrument, a family of the tradable instrument, a price of the incoming electronic trading order, one or more set-valued attributes of the tradable instrument, and on a quantity of the incoming electronic trading order, according to a predetermined ordering.

18. The electronic trading system according to claim 1, wherein the matching engine identifies the transaction in real-time or near real-time with receiving corresponding incoming electronic trading orders, while executing electronic continuous trading.

19. The electronic trading system according to claim 1, wherein the stored electronic trading orders include orders for inventories of at least one of advertising futures, container shipment futures, stock swaps, designer CDOs, extended sets of oil and industrial chemicals varieties futures, FLEX options, reinsurance, food products, alcoholic or non-alcoholic beverages, mining products, paper and pulp products, automotive products, lumber and wood products, satellite services, and unstructured debt obligations.

20. A method performed by at least one processor of an electronic trading system, comprising:
  accessing, using the at least one processor, a dynamically changing set of stored electronic trading orders for a tradable instrument corresponding to a variant inventory, in a monitored database, each electronic trading order being in the form of a record having a plurality of attributes including a first set of unitary-valued attributes and a second set of set-valued attributes, wherein each unitary-valued attribute in the first set has exactly one data item specified in the record as its value, and at least one of the set-valued attributes of the second set has more than one data item specified in the record as its value;
  receiving, using the at least one processor and via a network, incoming electronic trading orders for the tradable instrument from one or more external computing devices;
  comparing, by operations performed by a matching engine executed on the at least one processor and configured to perform continuous matching in accordance with a plurality of matching rules, a first record corresponding to the first set of unitary-valued attributes and the second set of set-valued attributes of an incoming electronic order with a plurality of second records each corresponding to the first set of unitary-valued attributes and the second set of set-valued attributes of at least one of said stored electronic orders in the monitored database in real time, wherein the comparing the first record to the a second record from the plurality of second records includes:
  comparing the first set of unitary-valued attributes from the first record to the second set of unitary-valued attributes from the second record; and
    only if said comparing the first set of unitary-valued attributes from the first record to the second set of unitary-valued attributes from the second record results in a successful match for unitary-valued attributes in the first record, comparing the second set of set-valued attributes from the first record to the second set of set-valued attributes of the second record, wherein at least one of the set-valued attributes in each of the first record and the second record specify a delivery requirement or a delivery commitment for the variant inventory;
  identifying, by operations performed by the matching engine, a transaction for the variant inventory when:
    for each of one or more second records from the plurality of second records said comparing the first record to the second record includes determining a successful match of the first record to the second record where:
    (A) the exactly one data item specified as the value of a particular unitary-valued attribute in the first set of unitary-valued attributes of the first record is identical to the exactly one data item specified as the value of a corresponding unitary-valued attribute in the first set of unitary-valued attributes of the second record; and
    (B) at least one data item in the set of multiple data items specified as the value of a particular set-valued attribute of the first record is identical to a data item in the set of multiple data items specified as the value of the corresponding set-valued attribute in the second set of set-valued attributes of the second record; and
  a volume requirement specified in the first record is satisfied by an aggregate of volume commitments specified in the one or more second records providing a successful and complete match between the first record and the one or more second records;
  updating, using the at least one processor, the monitored database in accordance with the identified transaction;
  transmitting, from the matching engine to at least one server, information corresponding to the identified transaction;
  keep track, by operations performed by the at least one server, of successfully matched orders of the identified transaction transmitted by the matching engine; and
  store, by operations performed by the at least one server, upon said successful and complete match, said information associated with the identified transaction at least until delivery corresponding to the identified transaction has been completed according to the delivery requirement specified in the first record.

21. A non-transitory computer readable storage medium storing program instructions that, when executed by a processor of a computer, causes the computer to perform operations, comprising:

accessing a dynamically changing set of stored electronic trading orders for a tradable instrument corresponding to a variant inventory in a monitored database, each electronic trading order being in the form of a record having a plurality of attributes including a first set of unitary-valued attributes and a second set of set-valued attributes, wherein each unitary-valued attribute in the first set has exactly one data item specified in the record as its value, and at least one of the set-valued attributes of the second set has more than one data item specified in the record as its value;

receiving, via a network, incoming electronic trading orders for the tradable instrument from one or more external computing devices;

comparing, by operations performed by a matching engine configured to perform continuous matching in accordance with a plurality of matching rules, a first record corresponding to the first set of unitary-valued attributes and the second set of set-valued attributes of an incoming electronic order with a plurality of second records each corresponding to the first set of unitary-valued attributes and the second set of set-valued attributes of at least one of said stored electronic orders in the monitored database in real time, wherein the comparing the first record to a second record from the plurality of second records includes:

comparing the first set of unitary-valued attributes from the first record to the second set of unitary-valued attributes from the second record; and only if said comparing the first set of unitary-valued attributes from the first record to the second set of unitary-valued attributes from the second record results in a successful match for unitary-valued attributes in the first record, comparing the second set of set-valued attributes from the first record to the second set of set-valued attributes of the second record, wherein at least one of the set-valued attributes in each of the first record and the second record specify a delivery requirement or a delivery commitment for the variant inventory;

identifying, by operations performed by the matching engine, a transaction for the variant inventory when:

for each of one or more second records from the plurality of second records, said comparing the first record to the second record includes determining a successful match of the first record to the second record where:

(A) the exactly one data item specified as the value of a particular unitary-valued attribute in the first set of unitary-valued attributes of the first record is identical to the exactly one data item specified as the value of a corresponding unitary-valued attribute in the first set of unitary-valued attributes of the second record; and (B) at least one data item in the set of multiple data items specified as the value of a particular set-valued attribute of the first record is identical to a data item in the set of multiple data items specified as the value of the corresponding set-valued attribute in the second set of set-valued attributes of the second record; and a volume requirement specified in the first record is satisfied by an aggregate of volume commitments specified in the one or more second records providing a successful and complete match between the first record and the one or more second records;

updating the monitored database in accordance with the identified transaction;

transmitting, from the matching engine to at least one server, information corresponding to the identified transaction;

keep track, by operations performed by the at least one server, of successfully matched orders of the identified transaction transmitted by the matching engine; and store, by operations performed by the at least one server, upon said successful and complete match, said information associated with the identified transaction at least until delivery corresponding to the identified transaction has been completed according to the delivery requirement specified in the first record.

* * * * *